United States Patent
Martin

(10) Patent No.: US 12,364,175 B2
(45) Date of Patent: Jul. 22, 2025

(54) ROW CLEANER AND ROW CLOSER ASSEMBLIES FOR STRIP TILL PLANTERS

(71) Applicant: Ronald Steve Martin, Elkton, KY (US)

(72) Inventor: Ronald Steve Martin, Elkton, KY (US)

( * ) Notice: Subject to any disclaimer, the term of this patent is extended or adjusted under 35 U.S.C. 154(b) by 689 days.

(21) Appl. No.: 17/140,950

(22) Filed: Jan. 4, 2021

(65) Prior Publication Data

US 2022/0210962 A1 Jul. 7, 2022

(51) Int. Cl.
*A01B 49/02* (2006.01)
*A01B 5/06* (2006.01)
*A01B 27/00* (2006.01)
*A01B 63/24* (2006.01)
*A01C 7/00* (2006.01)

(52) U.S. Cl.
CPC ............... *A01B 49/02* (2013.01); *A01B 5/06* (2013.01); *A01B 27/00* (2013.01); *A01B 63/24* (2013.01); *A01C 7/006* (2013.01)

(58) Field of Classification Search
CPC ........... A01B 27/00; A01B 5/06; A01B 49/02; A01B 63/24; A01C 5/064; A01C 7/006
USPC .......................................... 172/158; 111/139
See application file for complete search history.

(56) References Cited

U.S. PATENT DOCUMENTS

| | | | |
|---|---|---|---|
| 2,341,143 A * | 2/1944 | Herr ....................... | A01B 17/00 172/158 |
| 3,093,196 A * | 6/1963 | Nakatani ................ | A01C 5/064 172/569 |
| 4,550,122 A * | 10/1985 | David et al. ........... | A01C 5/064 172/158 |
| 4,834,189 A * | 5/1989 | Peterson et al. ....... | A01B 39/14 172/158 |
| 5,640,914 A * | 6/1997 | Rawson .................. | A01B 49/06 172/31 |
| 5,697,455 A * | 12/1997 | Deckler .................. | A01C 5/062 172/624.5 |
| 7,240,627 B1 * | 7/2007 | Whalen et al. ........ | A01C 5/066 172/603 |
| 7,975,629 B1 * | 7/2011 | Martin ................... | A01C 5/066 111/163 |
| 8,393,407 B2 * | 3/2013 | Freed ..................... | A01B 35/28 172/551 |
| 8,752,642 B2 * | 6/2014 | Whalen et al. ........ | A01B 63/008 111/200 |
| 8,826,836 B2 * | 9/2014 | Van Buskirk et al. ..................... A01C 7/006 111/163 |

(Continued)

*Primary Examiner* — Christopher J Sebesta
*Assistant Examiner* — Joel F. Mitchell
(74) *Attorney, Agent, or Firm* — Duncan Galloway Greenwald PLLC; Kevin T. Duncan

(57) ABSTRACT

A row cleaner connected to a strip till machine clears mulch and other debris in strip or low till planting. A row cleaner frame assembly includes a pair of row cleaner arms and a pair of clearing wheels having toe-in alignment. The pair of row cleaner arms share a common plane and are pivotally connected at a pair of pivot points common or close to the rotational axis of a cutting disc. The cutting disc is disposed intermediate the pair of row cleaner arms. The row cleaner arms are configured to maintain the clearing wheels in close-proximity to the cutting disc to provide stretch and cut row clearing operation. An actuator pivotally adjusts the row cleaner assembly relative to the cutting disc. A pivot limiter restricts pivotal travel of the row cleaner. A row closing section lever adjusts toe and/or camber of a closing wheel.

18 Claims, 11 Drawing Sheets

(56) References Cited

U.S. PATENT DOCUMENTS

| | | | |
|---|---|---|---|
| 9,554,504 B2* | 1/2017 | Houck | G05D 1/0219 |
| 2010/0275827 A1* | 11/2010 | Van Buskirk et al. | A01B 33/087 172/140 |
| 2018/0242513 A1* | 8/2018 | Bedosti et al. | A01C 5/064 |
| 2019/0281756 A1* | 9/2019 | Sivinski | A01C 7/201 |
| 2020/0281111 A1* | 9/2020 | Walter et al. | A01C 7/208 |
| 2020/0344944 A1* | 11/2020 | Wonderlich et al. | A01C 7/205 |
| 2025/0063963 A1* | 2/2025 | Craig | A01B 27/00 |
| 2025/0063964 A1* | 2/2025 | Preller et al. | A01B 15/16 |

\* cited by examiner

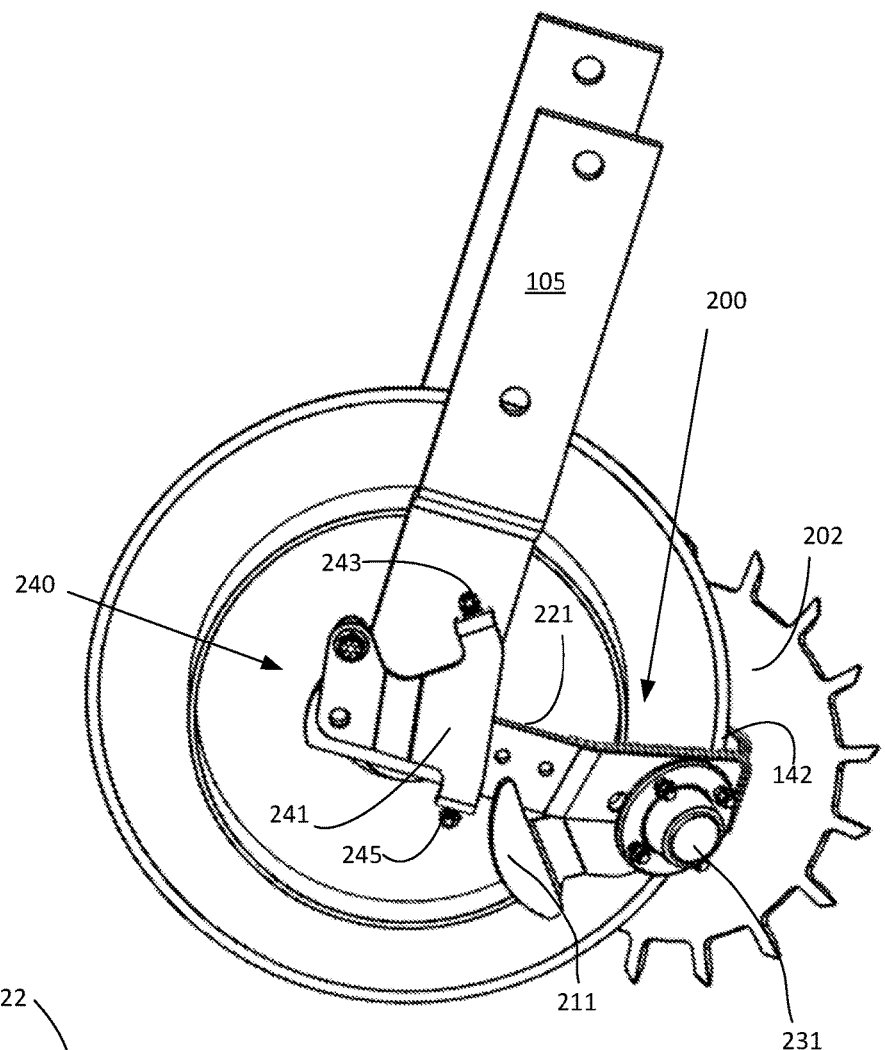
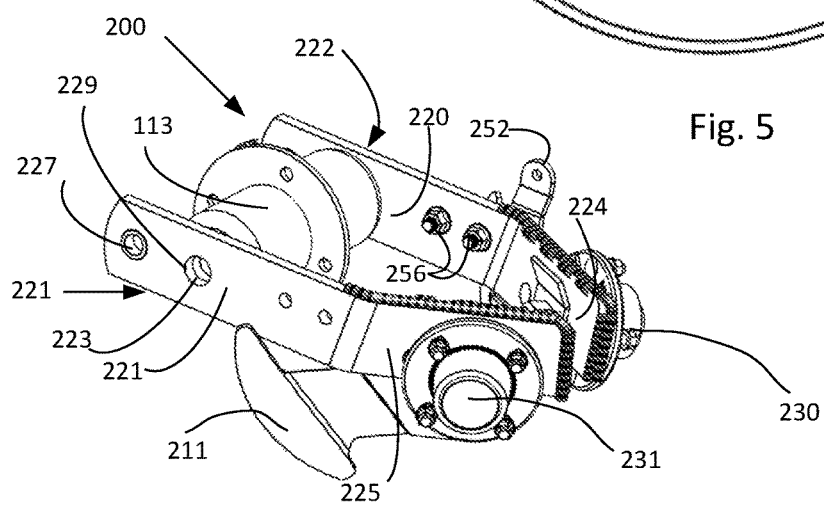
Fig. 5
Fig. 6

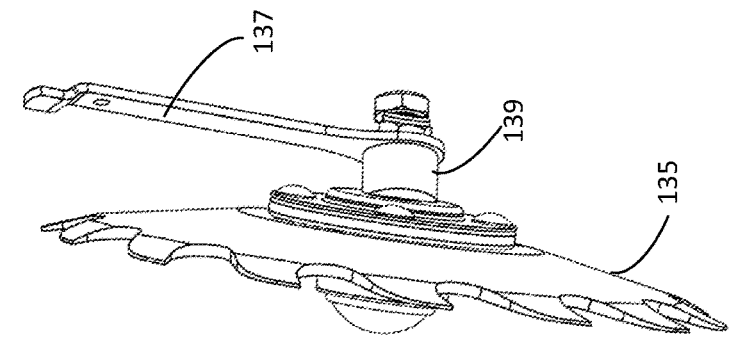# 
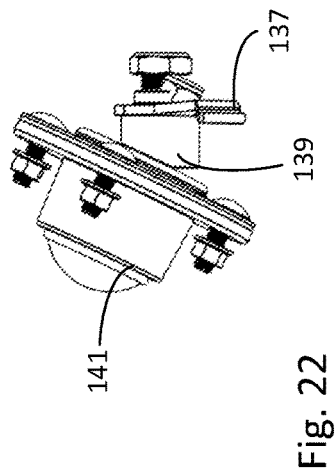
Fig. 21
Fig. 22
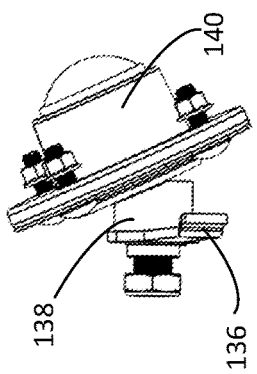
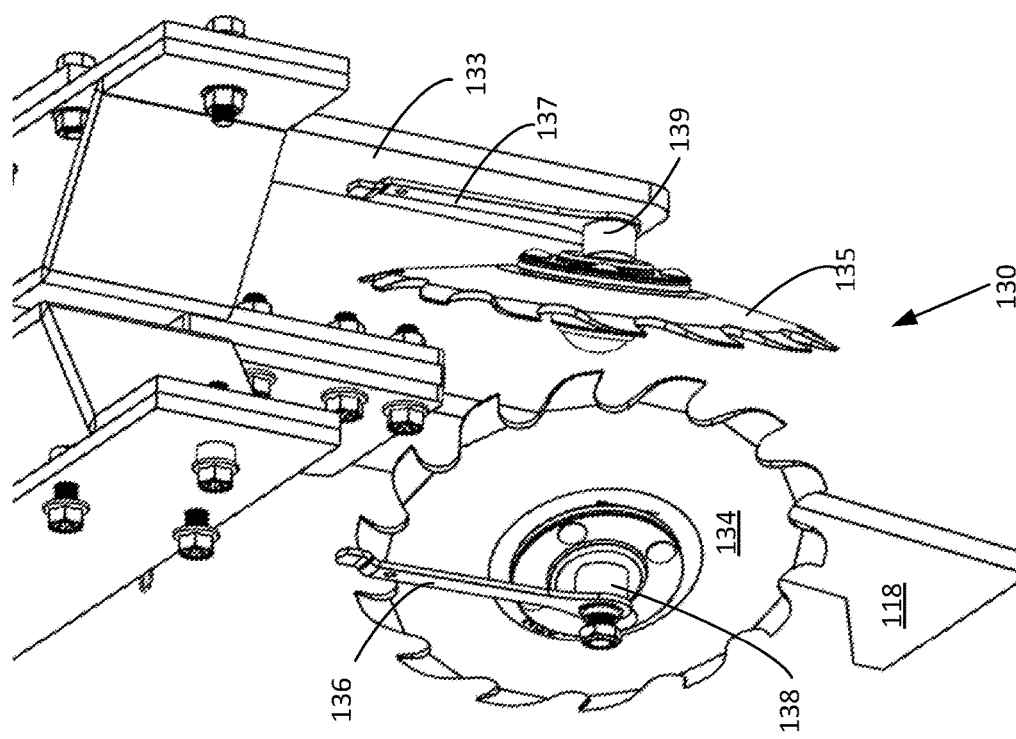
Fig. 20

ROW CLEANER AND ROW CLOSER ASSEMBLIES FOR STRIP TILL PLANTERS

FIELD OF THE INVENTION

The present disclosure is generally applicable to the field of agricultural equipment, and more particularly for improved row cleaning and row closing in strip till farming applications.

AUTHORIZATION PURSUANT TO 37 C.F.R. § 1.171 (d)(c)

A portion of the disclosure of this patent document contains material which is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

The background description includes information that may be useful in understanding the present invention. It is not an admission that any of the information provided herein is prior art or relevant to the presently claimed invention, or that any publication specifically or implicitly referenced is prior art.

An example of a prior art rotary row cleaner is described in U.S. Pat. No. 4,785,890 (Martin) entitled GROUND-DRIVEN ROTARY ROW CLEANER, the entirety of which is hereby incorporated herein by reference.

In traditional and longstanding farming methods, tilling or tillage is typically used before planting to prepare a field. Tilling a field has both herbicidal and insecticidal benefits and may serve to break up the earth to enable seedlings to more easily extend root systems. However, there are downsides to tillage that are driving modern farmers towards "low-till" or "no-till" or "strip till" farming systems. In these farming systems, plant matter left over from previous harvests, called residue, is left in the fields between plantings. At the time of planting, a row cleaner system is used at the front or leading portion of a planter row unit to clear only a small portion or "strip" of earth of the residue to enable seeds and fertilizer to be placed in the ground in connection with a coulter or other tillage tool. The row cleaner removes residue and in connection with other planter components, such as coulter, opening or cutting discs and strip till shank, lightly tills the topmost soil or earth to provide for a clear path for seed and fertilizer placement. One key aspect to row cleaner operation is to maintain necessary clearance between the row cleaner and the coulter or other tillage tool for terrain responsive operation. Also, at the trailing end of the planter row unit closing wheels are used to close the seed slot opened during row planting operation.

No-till farming systems provide for benefits including increased water retention and absorption, and increased presence of beneficial fungi, bacteria, and fauna (e.g., earthworms). The use of a no-till farming system has the additional benefit of reducing topsoil erosion that may be caused by tilling. In no-till systems it has also been shown that because water retention is greater and soil erosion is reduced, the environmental impact from the runoff of fertilizer, herbicides, and pesticides is also reduced.

The farming system known as strip till farming, is also a conservation method that uses low or minimum tillage. Strip till method provides the soil drying and warming benefits associated with conventional tillage and provides the soil erosion avoidance or protecting advantages of no-till farming. With strip till farming, only the portion of the soil that is to contain the seed row is tilled or disturbed. Strip till method typically requires multiple passes, depending on the strip-till implement used and the field conditions. Typically, rows that have been strip tilled are eight to ten inches wide. In no-till, low till or strip till methods weed suppression may be a problem and so farmers often use cover crops, mulching, laying straw, mowing or herbicides to maintain fields, which leads to extra cost and may lead to more residue during planting.

Planters typically use a cutting disc (or disk) and/or coulter designed to cut through crop residue and break the top crust of the soil. Often row cleaners, such as made by Martin Industries of Elkton, Kentucky, are used to help remove or break up debris ahead of the coulter/cutting disc to allow the coulter or cutting disc to cut into the soil and help an opener make a furrow for more effective and uniform seed planting. After row cleaner, coulter and disk opener prepare the furrow for planting, the seed is dropped into the furrow that has been created (along with fertilizer and other additives as desired) and then a press wheel closes the furrow. Often a closing section is provided to help close the furrow ahead of a second stage press wheel. Row openers clear the path of debris and the coulter or cutting disc breaks the soil crust to facilitate opening and seed depth control for the furrow opener. The row closing section and trailing or second stage press wheel help insure moist soil is in contact with seeds to cover them at proper seed depth as it presses the soil firmly (to varying degrees depending on soil conditions and crop type) around the seeds. The soil is left loose enough to minimize soil crusting to promote healthy and uniform emergence.

The movement towards no-till or low till farming systems has driven the improvement of row cleaner apparatuses for planting systems. Existing row cleaner systems include fixed row cleaners, adjustable row cleaners, and floating row cleaners, which have drawbacks. Fixed row cleaners do not follow or track changes in land elevation as the planter moves over a field. Adjustable and floating row cleaners may not possess the ideal geometry with respect to a planter to provide for optimal row cleaning action by the cleaner wheel assemblies. Additionally, after seeds have been planted the open planted row need to be closed. Existing row closing assemblies comprise drawbacks and limitations. Depending on the camber or toe alignment of closing wheels, the closing action may not be effective and may do harm to germination and emergence of planted seeds. Namely, existing fixed row closing assemblies do not provide an adjustable means to orient the closing wheels to provide desired camber and toe alignment to take into account soil and debris conditions to promote healthy emergence.

As it relates to the closing operation, if the closing wheel assembly is at too low of an angle, the closing action of the wheel assembly may be considered "negative" as opposed to the desired "positive" closing action of a level closing wheel assembly. Prior art closing wheel assemblies can be centered over an open row or seed slot where seeds have been planted. However, most cannot be adjusted at all, or if they can be adjusted they cannot be adjusted to compensate for changes in elevation over a row or seed slot. A 13" spading closing wheel is 1" greater in diameter than a standard smooth closing wheel. This is by design to allow the wheels to engage the soil and effectively close the seed slot. When working in looser soils, the spading closing wheels frequently engage the soil deeper than in firmer soils. To help reduce this excessive soil engagement, down pressure may need to be reduced, e.g., to a minimum setting, by adjusting the angle of the entire closing wheel assembly. Greater down pressure settings tend to lower the rear of the closing wheel arm assembly, which reduces the gathering action of the two spading closing wheels. As shown in pending U.S. patent application Ser. No. 16/593,765 (Martin) filed Oct. 4, 2019, the entirety of which is incorporated herein by reference, FIGS. 1-4 in that application illustrate a prior art closing wheel arm to illustrate the problem. The angle of the closing wheel arm assembly influences the gathering action of the spading closing wheels. A low closing wheel arm (FIG. 1) angle creates the negative closing action (FIG. 2), and a level closing wheel arm (FIG. 3) creates the positive closing action (FIG. 4).

The following references, each of which are incorporated by reference herein in their entirety, describe row cleaner designs: U.S. Pat. No. 7,861,660, entitled ADJUSTABLE ROW CLEANER, Martin, issued Jan. 4, 2011; U.S. Pat. No. 8,794,165, entitled ADJUSTABLE ROW CLEANER, Martin, issued Aug. 5, 2014; and in U.S. Pat. No. 9,743,572, entitled ADJUSTABLE ROW CLEANER, Martin, issued Aug. 29, 2017; and such as floating row cleaners provided U.S. Pat. No. 8,631,879B1, entitled COMPACT FLOATING ROW CLEANER, Martin, issued Jan. 21, 2014; and U.S. Pat. No. 9,642,298, entitled COMPACT FLOATING ROW CLEANER, Martin, issued May 9, 2017; and U.S. Prov. Pat. App. No. 62/623,198, entitled COMPACT PARALLEL ARM ROW CLEANER, Martin et al., filed Jan. 28, 2018.

What is needed is an adjustable row cleaning or clearing assembly for use in strip till planter farming operation to better clear debris, as typically encountered in strip till applications, ahead of seed planting components of strip till row planting units.

What is also needed is a single lever user interface to provide for the adjustment of the angle of penetration of row closer wheels with respect to a furrow or seed troughs typically generated in strip till applications by seed planting components of strip till row planting units.

SUMMARY OF THE INVENTION

The present invention provides a row cleaner system that provides an effective and efficient solution that improves both row cleaning operation in strip till farming operations to effectively stretch or pull and cut debris to more effectively remove debris ahead of the seed planting components and row closing components.

The present invention also provides a means to control the angle of the row cleaning wheels relative to ground and the down-pressure applied by the row cleaner during operation. An actuator is operatively attached to the row cleaner and allows for user optimization or customization of the down-pressure and angle incident to ground. The row cleaner has an A-shaped set of arms that are pivotally attached to a fixed frame. The actuator is operatively attached at one end to the fixed frame and at another end by means of an extendable arm. The arm extends a range of linear or other movement and biases the row cleaner based on a control signal, such as an electrical, pneumatic or hydraulic sourced signal. A limiter restricts the pivotal range of movement of the row cleaner to prevent further damage to the actuator that may be caused by mechanical forces experienced at the limits of the arm movement from fully retracted to fully extended positions.

Closing/cleaning wheels have teeth configured typically in a toe-in alignment and may interlink or mesh effectively in a rotating operation to engage the ground and stretch residue and other debris. A cutting disc trails the row cleaning wheels and is located in close-proximity to the cleaning wheels to cut stretched debris to allow the cleaning wheels to more efficiently pull debris to the side and away from the furrow for improved seed planting and row closing.

Another problem with prior art row cleaner assemblies is the different angle configurations encountered, i.e., the angle of the row cleaner frame determined at the pivot points relative to ground. If the row cleaner frame is generally parallel to ground, i.e., the pivot points generally lie in the same plane with the centers of the row clearing wheels, then unbiased row cleaner wheels are less aggressive and the weight of the row cleaner and zero-angle position may not adequately perform row clearing operation. In this situation the present invention provides an actuator to bias the row cleaner downward to more aggressively engage the debris layer. On the other hand, if the row cleaner frame is attached higher up a supporting structure such that the frame forms an angle to ground, i.e., is not parallel to the ground, then the row cleaner may double back on itself and may too aggressively engage the soil and dig a ditch in the area of the furrow. In this situation the present invention provides an actuator to lift the row cleaner to be less aggressive and to avoid trenching. The present invention provides a control system to provide adjustability within a control range to achieve the desired row cleaning action in light of soil and debris conditions encountered in the field.

In connection with one embodiment of the present invention the control system comprises a pneumatic, electrical, hydraulic or electro-mechanical actuator or piston positioned in a horizontal orientation, perpendicular to a fixed frame. For example, the actuator may be secured at its back end to the frame mounting plate by a pin and at the opposite end via an extendable arm to the pivotable row cleaner providing pivoting of the row cleaner relative to the fixed frame in an angular fashion about a row cleaner mounting point or pivot and may include a bushing or bearing.

As the actuator arm extends and retracts, or compresses and decompresses, it maintains a substantially horizontal position relative to the ground but it too pivots or rotates about its fixed end as the row cleaner pivots or rotates. By maintaining the orientation and angle of the row cleaner the present invention keeps the row clearing wheels of the wheel assemblies in the desired orientation with respect to the ground to provide for optimal debris clearing without excessive soil engagement. A row cleaner travel limiter prevents damage to the actuator.

The present invention further provides a closing wheel assembly adapted or configured to provide for the adjustment of the orientation of closing wheels with respect to the furrow. The closing wheel assembly consists of lever pivotally mounted to a closing wheel axle assembly that is angled to provide a desired range of toe and/or camber alignment for proper furrow closing.

In a first embodiment the present invention provides a row cleaner for attaching to a strip till machine having a frame mounting plate, a cutting disc, an axle adapted to permit rotation of the cutting disc, and a set of oppositely facing posts connected to the frame mounting plate and adapted to support the axle and the cutting disc at a pair of connecting points, the row cleaner adapted to clear mulch and other debris encountered in strip or low till planting and comprising: a row cleaner frame assembly connected to and supported by the set of oppositely facing posts, the row cleaner frame assembly comprising: a pair of row cleaner arms each having a proximal end located proximal to the set of oppositely facing posts, and a distal end located distal to the set of oppositely facing posts, the row cleaner arm proximal ends being spaced apart and disposed on opposite sides of the cutting disc; and a pair of clearing wheels each having a wheel body and a set of spaced apart teeth protruding radially about the circumference of the wheel body, the pair of row cleaner wheels rotationally connected, respectively, to the row cleaner arm distal ends and being configured to have a toe-in alignment to assist in debris removal; wherein the pair of row cleaner arms share a common plane and are pivotally connected at the proximal ends to the oppositely facing posts at a pair of pivot points with the cutting disc disposed intermediate the proximal ends and the pivot points being common with or disposed close to a rotational axis of the cutting disc; and wherein the row clearing wheels are in a close-proximity to the cutting disc.

The first embodiment may further be characterized in one or more of the following manners: wherein close-proximity is determined by a wheel center line extending between the centers of the clearing wheels and generally orthogonal to the cutting disc, the wheel center line being at or coming within 0.5 inch of a leading edge of the cutting disc or intersecting the cutting disc; wherein close-proximity is determined by a wheel center plane extending between the centers of the closing wheels and in a direction parallel to the ground during operation of the strip till machine, the wheel center plane falling within the cutting disc or coming within 0.5 inch of a leading edge of the cutting disc; wherein the set of spaced apart teeth are uniformly spaced apart along the circumference of the wheel body, and wherein with rotation of the pair of clearing wheels through the debris field during operation of a strip till machine a trailing line is defined to be between teeth exiting the debris field and generally orthogonal to the cutting disc, wherein close-proximity is determined by the trailing line at a leading edge of the cutting disc or intersecting the cutting disc; wherein the set of spaced apart teeth are uniformly spaced apart along the circumference of the wheel body, and wherein with rotation of the pair of clearing wheels through the debris field during operation of a strip till machine a trailing plane is defined as extending between teeth exiting the debris field and generally orthogonal to ground during strip till operation, wherein close-proximity is determined by the trailing plane at the leading edge of the cutting disc or intersecting the cutting disc; wherein the pair of clearing wheels are configured to have a positive camber relative to ground; wherein each of the pair of row cleaner arms has a proximal section including a series of pivot points, the series of pivot points providing alternative proximal end locations and adjustable proximity of the row cleaning wheels and a leading edge of the cutting disc; wherein each of the pair of row cleaner arms has a parallel section at which the proximal end is disposed and an angled distal section at which a row cleaner wheel is attached, whereby the two parallel sections are essentially parallel to each other and the two angled distal sections angle in toward one another and provide a toe-in configuration; wherein the two row cleaner arm angled distal sections come together at a junction at a point most distal from the set of oppositely facing posts; wherein row clearing wheels are mounted, respectively, at a selected one of a series of mounting points disposed along each row cleaner arm angled section; wherein the cutting disc and axle are rotatably attached to each post at the row cleaner arm pivot points such that the rotational axis defined by the axle and the connecting points on the oppositely facing posts lies in a common axis with the two row cleaner arm pivot points; wherein the row cleaner arm pivot points are not common with and are disposed above the cutting disc rotational axis; further comprising: an actuator having a fixed body portion and an extendable arm portion operably connected to a row cleaner arm, the actuator having a control input and being adapted to receive a control input from a control system for controlling displacement of the extendable arm to extend from a retracted position to an extended position and to retract from the extended position to the retracted position or points therebetween, whereby the actuator causes the row cleaner frame to rotate about the pair of pivot points; further comprising a row cleaner assembly travel limiter providing upper and lower limits to restrict pivoting travel of the row cleaner about the pair of pivot points thereby preventing excessive forces from acting on the actuator.

In a second embodiment the present invention provides a strip till machine comprising: a frame mounting plate; a cutting disc and an axle adapted to permit rotation of the cutting disc; a set of oppositely facing posts connected to the frame mounting plate and adapted to support the axle and the cutting disc at a pair of connecting points, the cutting disc adapted to rotate about a rotational axis defined by the axle and the connecting points on the oppositely facing posts; a row cleaner adapted to clear mulch and other debris encountered in strip or low till planting and comprising: a row cleaner frame assembly connected to and supported by the set of oppositely facing posts, the row cleaner frame assembly comprising: a pair of row cleaner arms each having a proximal end located proximal to the set of oppositely facing posts, and a distal end located distal to the set of oppositely facing posts, the row cleaner arm proximal ends being spaced apart and disposed on opposite sides of the cutting disc; and a pair of clearing wheels each having a wheel body and a set of spaced apart teeth protruding radially about the circumference of the wheel body, the pair of row cleaner wheels rotationally connected, respectively, to the row cleaner arm distal ends and being configured to have a toe-in alignment to assist in debris removal; wherein the pair of row cleaner arms share a common plane and are pivotally connected at the proximal ends to the oppositely facing posts at a pair of pivot points with the cutting disc disposed intermediate the proximal ends and the pivot points being common with or disposed close to a rotational axis of the cutting disc; and wherein the row clearing wheels are in a close-proximity to the cutting disc.

The second embodiment may further be characterized in one or more of the following manners: further comprising a row closing wheel assembly comprising: at least one closing wheel attached in rotatable fashion to at least one axle having a face angled to effect a closing wheel toe-out configuration; at least one lever assembly having a lever coupled to the at least one axle and configured to provide adjustable positioning of the at least one closing wheel relative to the ground; wherein the at least one lever assembly further comprises: a ring portion connected to the at least one axle; and a lever position member comprising a plurality of locking points adapted to receive a pin, protrusion or other locking means provided on the lever to hold the lever in place and to maintain a desired orientation of the at least one closing wheel; further comprising: a set of upper plate connecting arms each having an upper front end and an upper rear end, each upper front end movably secured to the frame mounting plate at a set of upper frame pivot points with each upper rear end distal to the frame mounting plate; and a set of lower plate connecting arms each having a lower front end and a lower rear end, each lower front end movably secured to the frame mounting plate at a set of lower frame pivot points with each lower rear end distal to the frame mounting plate, wherein the sets of upper and lower connecting arms are parallel to one another and extend outward from the frame mounting plate; wherein the sets of upper and lower connecting arms are respectively connected to the goal posts at pivot points disposed on the upper and lower rear ends distal to the frame mounting plate.

BRIEF DESCRIPTION OF THE FIGURES

To facilitate a full understanding of the present invention, reference is now made to the accompanying drawings, in which like elements are referenced with like numerals. These drawings should not be construed as limiting the present invention but are intended to be exemplary and for reference.

In order that the advantages of the cleaning wheel will be readily understood, a more particular description of the assemblies briefly described above will be rendered by reference to specific embodiments illustrated in the appended drawings. Understanding that these drawings depict only typical embodiments of the cleaning wheel and are not therefore to be considered limited of its scope, the assemblies will be described and explained with additional specificity and detail through the use of the accompanying drawings.

FIG. 5 provides a side perspective featuring the limiter component and illustrating the close-proximity of row cleaner wheels and cutting disc of the first embodiment strip till row cleaner invention with components removed for ease of illustration.

FIG. 6 provides a side perspective illustrating the A-shaped or V-shaped configuration of the row cleaner frame and arms of the first embodiment strip till row cleaner invention with components removed for ease of illustration.

FIGS. 20-22 provide perspective illustrations of the first embodiment row closer invention featuring a single lever toe and camber adjustment mechanism and related closing wheel assembly with planter components removed for ease of illustration.

Figure 1:
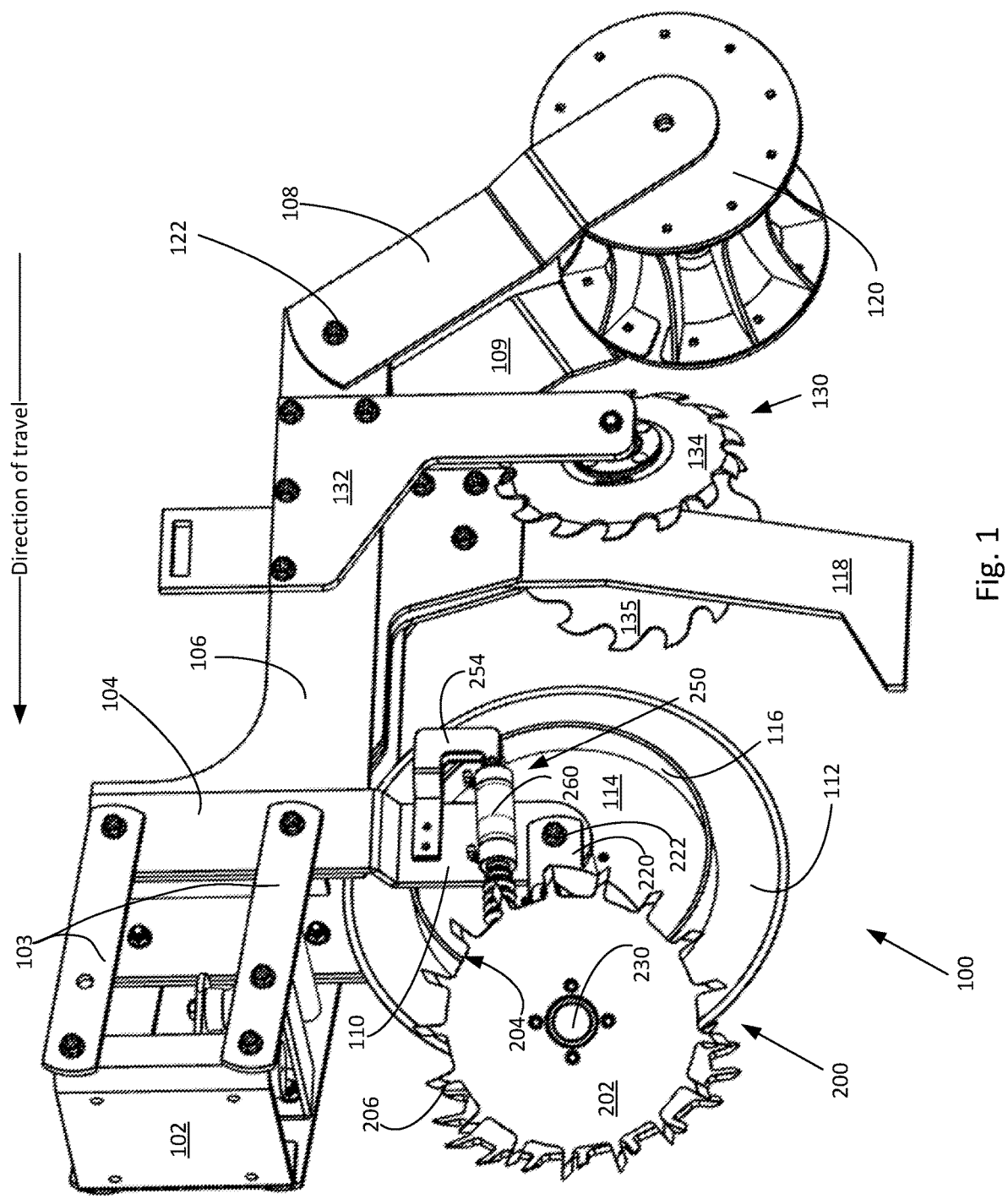
FIG. 1 provides a perspective illustration of a first embodiment strip till row cleaner invention and a first embodiment of a row closer invention in connection with a strip till machine.

| PARTS LIST | |
|---|---|
| 100 | Strip till machine |
| 102 | Machine frame plate |
| 103 | Connector bars |
| 104/105 | Goal posts 104 (LH) and 105 (RH) |
| 106/107 | Strip till side plates 106 (LH) and 107 (RH) |
| 108/109 | Rolling basket mounting arms 108 (LH) and 109 (RH) |
| 110/111 | Lower portions 110 (LH) and 111 (RH) of Goal posts |
| 112 | Cutting disc or coulter |
| 113 | axle and cutting disc wheel hub assembly |
| 114/115 | Cutting disc or coulter band plates 114 (LH) and 115 (RH) |
| 116/117 | Cutting disc depth bands 116 (LH) and 117 (RH) |
| 118 | Strip till shank or furrow opener |
| 120 | Rolling basket |
| 121/122 | Pivot mechanism |
| 130 | Row closing section |
| 132/133 | Row closer support members |
| 134/135 | Closing wheels |
| 136/137 | Closing wheel adjustment levers (LH-136) (RH-137) |
| 138/139 | Closing wheel axle/angled wheel mount (LH-138) (RH-139) |
| 140/141 | Closing Wheel hub (LH-140) (RH-141) |
| 142 | Leading or front edge of cutting disc 112 |
| 143 | Row cleaner wheel axis intersection (D1) |
| 144 | Row cleaner wheel axis intersection (D2) |
| 200 | Row cleaner |
| 202/203 | Cleaner or clearing wheel 202 (LH) and 203 (RH) |
| 202'/203' | Respective axis of cleaner or clearing wheels 202 and 203 |
| 204 | Gauge wheel depth or soil engagement limiter |
| 206 | Debris stretching or tensioning teeth |
| 210/211 | Scrapers |
| 220/221 | Row cleaner arms 220 (LH) and 221 (RH) |
| 222/223 | Pivots |
| 224/225 | Angled portions |
| 226 | Junction nose or portion |
| 227/229 | Row cleaner arm attachment points/pivots |
| 230/231 | Row cleaner wheel axle and hub assemblies 230 (LH) and 231 (RH) |
| 240 | Row cleaner travel limiter assembly |
| 241 | Limiter body |
| 243/245 | Limiter stops (upper and lower) |
| 247 | Nuts and bolts combination |
| 250 | Row cleaner angular displacement assembly |
| 252 | Actuator arm mount |
| 254 | Actuator support member |
| 256 | Nut and bolt combinations |
| 258 | Displacement angle alpha (α) |
| 260 | Actuator |
| 262 | Extendable arm |
| 264 | Actuator body mount portion |
| 266 | Actuator body mount portion connection point |
| 268/269 | Fitting or connectors |
| 280 | Row cleaner control system |
| 282/284 | Control and feedback lines |

DETAILED DESCRIPTION

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

In some embodiments, the numbers expressing quantities used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used herein, "fastener" may mean any suitable fastening means such as a nut and bolt, a rivet, or a pin and cotter pin. Typically, as used herein a fastener refers to a threaded bolt, which may have a hexagonal bolt head, secured by a correspondingly threaded nut having a hexagonal outer surface, wherein one or more washers may be used to permit movement of a fastened object about the bolt. In some embodiments, a locking nut may be used to further secure the nut to the bolt and to prevent the nut from backing off of the threads of the bolt.

Figure 2:
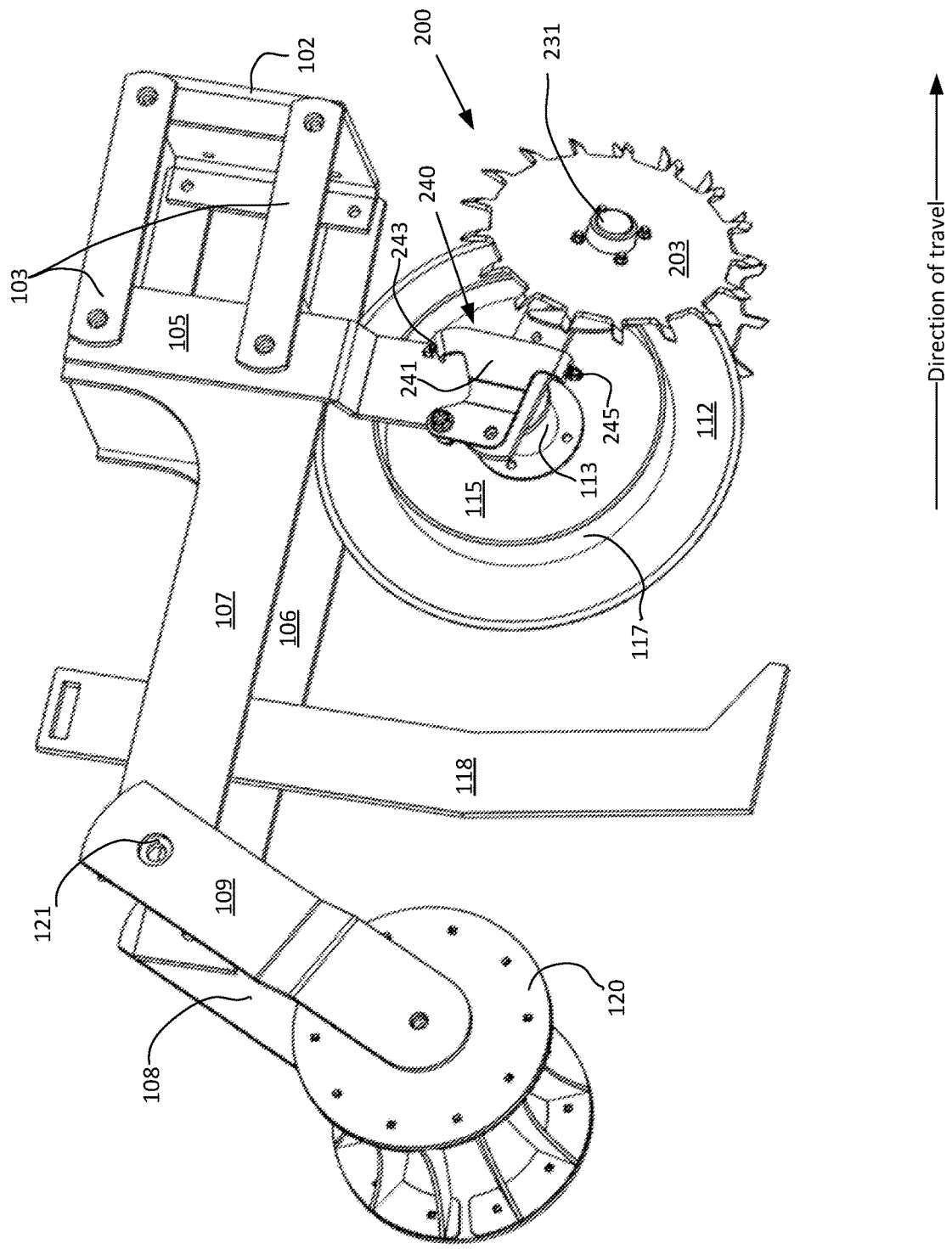
FIG. 2 provides a perspective illustration featuring a limiter component of the first embodiment strip till row cleaner invention with planter components removed for ease of illustration.

FIG. 1 provides a perspective illustration of a strip till machine 100 having a first exemplary embodiment strip till row cleaner assembly 200 and a first exemplary embodiment row closer assembly 130. FIG. 2 provides a perspective illustration featuring the limiter component 240 of the strip till row cleaner assembly 200 with planter components removed for ease of illustration.

With reference to FIGS. 1 and 2, a strip till machine 100 is shown having a row cleaner assembly 200, a row closing assembly 130, a rolling basket assembly 120, a strip till shank or furrow opener 118, and a frame plate 102. The frame plate 102 is attached to a tool bar or other planting accessory component of a tractor or other farming vehicle used to propel a set of connected strip till row planting units 100. Weld on tabs, U-bolts, head bracket mount, or other fastening mechanisms may be used in place of a frame plate. A set of connector bars 103 are attached at one end to the frame plate 102 and provide support for attached goal posts 104 (LH) and 105 (RH) and strip till side plates 106 (LH) and 107 (RH). Goal posts 104 (LH) and 105 (RH) are connected to and support row cleaner assembly 200 and cutting disc 112. Strip till side plates 106 (LH) and 107 (RH) are attached to rolling basket mounting arms 108 (LH) and 109 (RH) to support rolling basket 120. Respective lower portions 110 (LH) and 111 (RH) of goal posts 104 (LH) and 105 (RH) serve to support the cutting disc 112, the row cleaner assembly 130 and a row cleaner angular displacement assembly 250 having an actuator 260.

Cutting disc or coulter 112 and cutting disc or coulter band plates 114 (LH) and 115 (RH) and cutting disc depth bands 116 (LH) and 117 (RH) are rotatably connected to lower portions 110 (LH) and 111 (RH) of goal posts 104 (LH) and 105 (RH) at connecting points—here shown as connecting points 222 and 223 (concealed by travel limiter body 241 in FIG. 2).

Row cleaner assembly 200 includes row cleaner wheels 202 (LH) and 203 (RH) (also referred to as row cleaning or row clearing wheels), which are shown as having a body portion and a teeth portion. A gauge wheel depth or soil engagement limiter 204 serves to promote the cleaner wheels 202/203 to ride along the surface of the soil and to avoid excessive and undesired cutting into or working of the soil. A series of teeth 206 are disposed along the outer circumference of the wheels 202/203 and are configured to engage and bite into debris (such as residual debris, hay or mulch) encountered at the soil surface as the strip till row planting unit 100 traverses a field during a seed planting operation. Teeth 206 are configured to stretch surface debris and to bring debris (especially debris aligned generally horizontal to the direction of travel) into tension as will be explained in more detail below.

Row cleaner assembly 200 includes row cleaner arms 220 (LH) and 221 (RH), which are configured to rotate or pivot about cutting disc wheel hub and axle assembly 113 at connecting points or pivots 222 and 223. The connecting/rotational points of the cutting disc 112 may be shared with or separate from the connecting/pivot points of the row cleaner assembly 200. For example, the lower portions 110/111 of the goal posts 104/105 each may include a plurality or set of connection points, e.g., multiple bores or holes, for receiving fasteners to attach the cutting disc assembly and the row cleaner assembly. This plurality of connection points may be used to provide adjustability to the relative distance of the row cleaner wheels 202/203 to the leading edge 142 of the cutting disc 112.

Strip till row planting unit 100 includes, for example, a strip till shank or furrow opener (optionally could be a single or double disc-type opener) 118 and, although not shown, seed dispensing, fertilizing, and firming components. A rolling basket 120 is rotatably attached to mounting arms 108/109, which are attached to the stip till side plates 106/107 at pivots 121/122. Row closing section 130 (shown in FIG. 1) is attached to the strip till side plates 106/107 by row closer support members 132/133 to which are rotatably attached closing wheels 134 and 136.

FIG. 2 provides a less obstructed view of the row cleaner travel limiter assembly 240 having a limiter body 241, an upper limiter stop 243 and a lower limiter stop 245. Actuator 260 is securely attached to lower portion 110 (LH) of goal post 104 by way of piston support member 254 and is movably attached to the row cleaner 200 as shown in more detail in FIG. 7. Actuator 260 is shown as a linear actuator and may be mechanical, electro-mechanical, hydraulic, electric, electro-hydraulic, or pneumatic. As actuator 260 operates to rotate (raise and lower relative to ground) row cleaner assembly 200 about cutting disc 112, the upper limiter stop 243 restricts the range of movement of the row cleaner assembly 200 with the actuator 260 in a retracted position and the lower limiter stop 245 restricts the range of movement of the row cleaner assembly 200 with the actuator 260 in an extended position. The row cleaner travel limiter assembly 240 serves to protect actuator 260 from damage resulting from unwanted forces experienced by the actuator at the end of range positions that might be otherwise experience during planting operation or when moving the combine set of row cleaners in a raised position such as by elevating a tool bar. In essence, the row cleaner travel limiter prevents the actuator from being the mechanism limiting row cleaner pivoting movement.

Figures 3, 4:
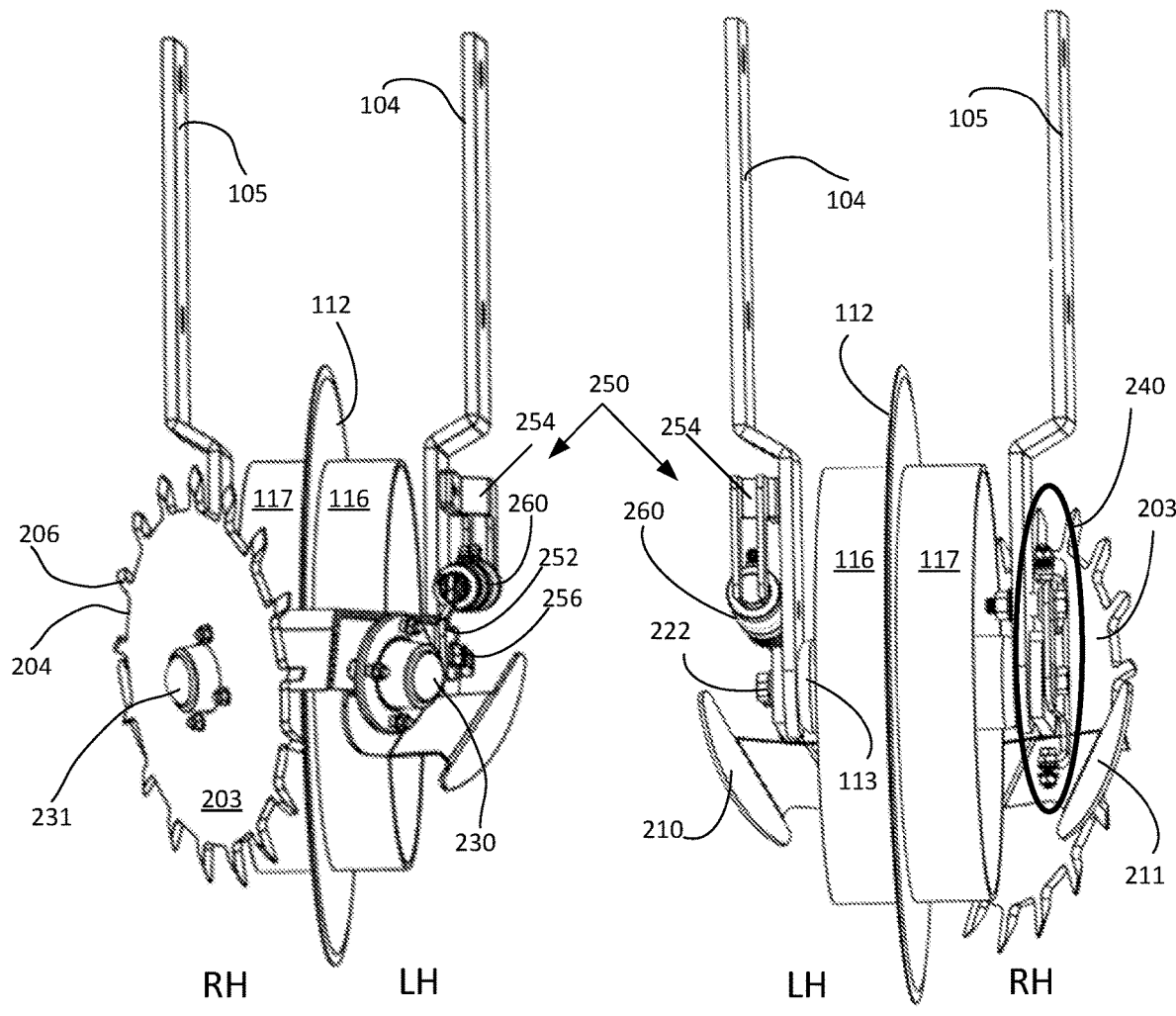
FIGS. 3 and 4 provide forward and rearward facing illustrations featuring the actuator and limiter components of the first embodiment strip till row cleaner invention with components removed for ease of illustration.

FIGS. 3 and 4 provide forward and rearward facing illustrations featuring the actuator and limiter components of the first embodiment strip till row cleaner invention with planter components removed for ease of illustration. As shown in FIGS. 3 and 4, row cleaner assembly 200 includes row cleaner travel limiter 240 and row cleaner angular displacement assembly 250 having actuator 260 operatively attached at one end to the row cleaner arm 220 and at an opposite end attached to and supported by goal post 104 at lower portion 110.

FIG. 3 is a front or forward-facing view of row cleaner 200 with the direction of travel of the row cleaner and strip till machine toward the viewer. From the front facing perspective the row cleaner and row cleaner wheels are shown in a substantial toe-in configuration. FIG. 4 is a rear or rearward-facing view of row cleaner 200 with the direction of travel being away from the viewer. Both figures show left-hand (LH) and right-hand (RH) sides of the row cleaning assembly 200, goal posts 104 (LH) and 105 (RH), lower portions or support members 110 (LH) and 111 (RH), cutting disc or coulter 112, cutting disc depth bands 116 (LH) and 117 (RH), optional debris scrapers 210 (LH) and 211 (RH), and cutting disc axle and wheel hub assembly 113. Depth bands 116/117 serve to promote travel of cutting disc 112 and to limit the depth to which the cutting disc 112 cuts into the ground.

With components removed, FIGS. 3 and 4 (and FIG. 7) provide less obstructed views of row cleaner angular displacement assembly 250 having actuator arm mount 252, actuator support member 254, nut/bolt or fastener members 256 and actuator 260. As shown, actuator 260 is in a generally retracted position. With components removed, FIG. 4 provides a less obstructed view of row cleaner travel limiter 240 (shown in oval) as described in detail above and below.

FIGS. 5 through 9 further depict row cleaner 200, row cleaner travel limiter assembly 240, and row cleaner angular displacement assembly 250 in more detail.

FIGS. 5 and 6 show in more detail row cleaner assembly 200. FIG. 5 provides a side perspective view, which illustrates the limiter component 240 and illustrates the close-proximity of row cleaner wheels 202/203 to the leading edge 142 of cutting disc 112 to provide an effective configuration to achieve the desired stretch and cut operation highly desired in strip till planting operation. In this exemplary embodiment, the row cleaner travel limiter assembly 240 includes a limiter body 241 with two travel stops—an upper limiter stop 243 and a lower limiter stop 245. As the extendable arm 262 of actuator 260 extends and retracts it causes the row cleaner assembly 200 to pivot or rotate about cutting disc 112 at pivots 222/223 thereby raising and lowering it relative to ground. The upper limiter stop 243 restricts the range of movement of the row cleaner assembly 200 (raised) with the extendable arm 262 of actuator 260 in a retracted position and the lower limiter stop 245 restricts the range of movement of the row cleaner assembly 200 (lowered) with the extendable arm 262 of actuator 260 in an extended position.

FIG. 6 provides a side perspective view that more clearly illustrates the "A"-shaped or "V"-shaped configuration of the row cleaner frame comprising arms 220/221. Cutting disc 112 and related parts are removed for ease of discussion. As shown in FIG. 6, row cleaner arms 220/221 of row cleaner assembly 200 include respective angled portions 224 and 225 to which are attached row cleaner wheel hub assemblies 230 (LH) and 231 (RH). Alternatively, hub assemblies 230/231 may be angled wheel mounts adapted to be adjusted to achieve toe and/or camber manipulation. Angled portions 224 and 225 may terminate at a junction, nose or portion 226 (see FIGS. 8-9) most distal to pivots 222/223.

As shown in FIG. 6, row cleaner arm 221 is provided with two attachment points/pivots 227 and 229 either of which may be used as pivot 223. Row cleaner arm 220 is also provided with two or more attachment points/pivots in like manner. With complimentary pivot points on both row cleaner arms 220/221, the relative positioning (proximity) of the row cleaner frame and row cleaner wheels 202/203 to cutting disc 112 is achieved and may be adjusted to address differing conditions presented in field planting operations. In this way the row cleaner 200 may be configured to achieve a desired distance between the row cleaner wheels 202/203 and the cutting disc 112 and in particular at the leading edge 142 of the cutting disc. Two or more such attachment points/pivots may be provided to allow for greater adjustability. The relative proximity of the row cleaning wheels 202/203 and cutting disc 112 and leading edge 142 is described in more detail below. Optional scrapers 210/211 may also be included to assist in row cleaning operation.

Figure 7:
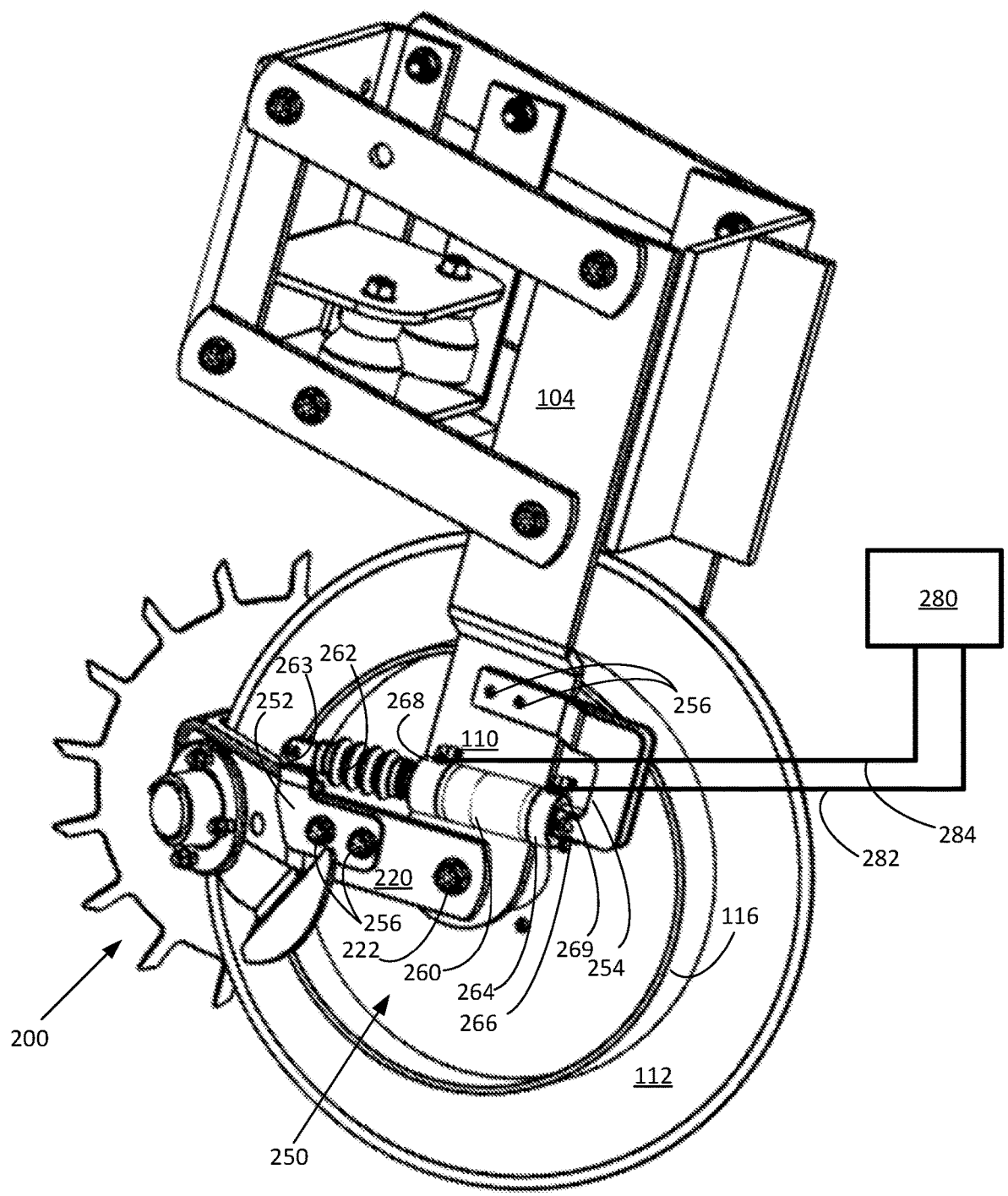
FIG. 7 provides a side perspective illustration featuring the actuator and control system components and close-proximity of row cleaner wheels and cutting disc of the first embodiment strip till row cleaner invention with components removed for ease of illustration.

FIG. 7 provides a side perspective illustration featuring the actuator and control system components and close-proximity of row cleaner wheels and cutting disc of the first embodiment strip till row cleaner invention with planter components removed for ease of illustration.

As shown in FIG. 7, row cleaner angular displacement assembly 250 includes an actuator 260 having an extendable arm 262 at one end and a body mount portion 264 at an other end. Actuator 260 also includes a feedback fitting or connector 268 and a control input fitting or connector 269. Actuator extendable arm 262 is connected to actuator arm mount 252 at connection point 263 such as by a nut and bolt or other fastener or affixing means. Actuator body mount portion or end 264 is connected at connection point 266 to a body attachment member or mount 254, which is attached to lower portion 110 of goal post 104. Actuator arm mount 252 and body attachment member or mount 254 are secured to row cleaner arm 220 by nut and bolt combinations 256 or other suitable fastener or fixation means.

Actuator feedback fitting or connector 268 and a control input fitting or connector 269 are operatively connected or otherwise in control communication with row cleaner control system 280. For example, control and feedback lines 282 and 284, which may be one and the same, are connected to the actuator 260. In the example shown, control and feedback lines 282 and 284 are respectively connected to actuator feedback fitting 268 and a control input fitting 269 so as to provide and receive pneumatic or hydraulic fluid signals. In an electrical system the lines 282 and 284 may alternatively be electrical or signal cable. The control system 280 and control of actuator 260 may be by one or a combination of electrical, digital, hydraulic, pneumatic, electro-pneumatic, electro-hydraulic and may be by fluid or electrical means and/or be hardwired or wireless. See for example the control operation as discussed in U.S. Publication No. 2020/0221629 (Martin) which is incorporated by reference herein in the entirety.

Figure 9:
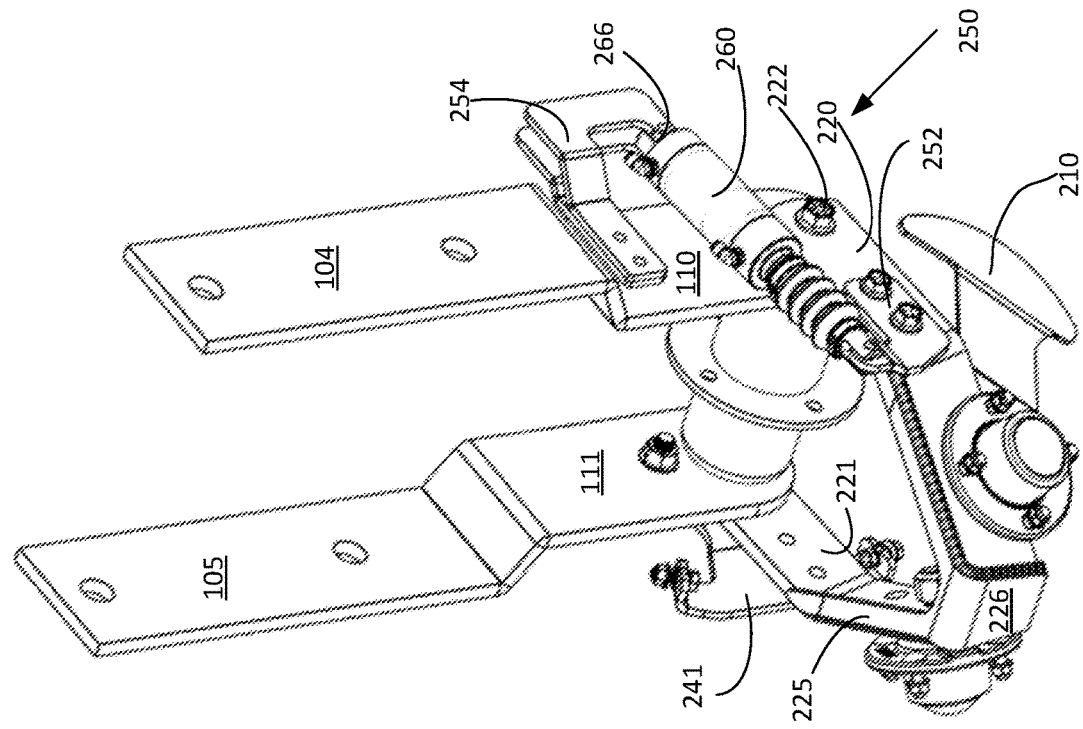
FIGS. 8 and 9 perspective illustrations featuring the limiter and actuator components and close-proximity of row cleaner wheels and cutting disc of the first embodiment strip till row cleaner invention with planter components removed for ease of illustration.
Figure 8:
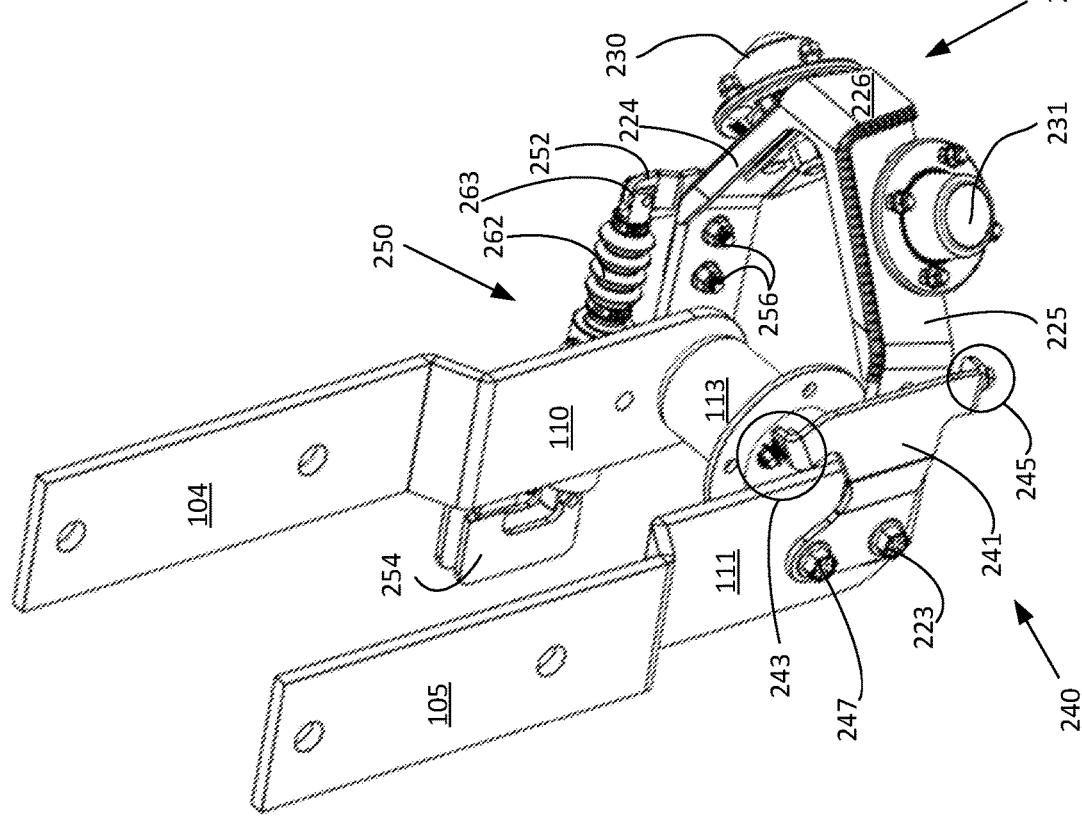

FIGS. 8 and 9 provide perspective illustrations featuring the limiter and actuator components and the row cleaner assembly configured to achieve close-proximity of row cleaner wheels and cutting disc with planter components removed for ease of illustration. FIGS. 8 and 9 further illustrate the components that make up the strip till row cleaner 200 and row cleaner angular displacement assembly 250 of the present invention. Row cleaner 200 and row cleaner angular displacement assembly 250 are essentially supported by goal posts 104 and 105. Row cleaner arms 220 and 221 as shown join at or via blunt junction or nose portion or member 226.

As shown in part in FIG. 7, actuator extendable arm 262 of actuator 260 is connected to actuator arm mount 252 at connection point 263 such as by a nut and bolt or other affixing means. Actuator arm mount 252 is secured by nut and bolt combinations 256 or other suitable fixation means to row cleaner arm 220. Actuator body mount portion or end 264 is connected at connection point 266 to a body attachment member or mount 254, which is attached to lower portion 110 of goal post 104.

FIGS. 8 and 9 further illustrate row cleaner travel limiter assembly 240 having a limiter body 241 with upper and lower stops 243 and 245. Row cleaner travel limiter assembly 240 is mounted to lower portion 111 of goal post 105 by means of nuts and bolts combination 247 and pivot 223, and includes limiter body 241 with upper stop 243 and lower stop 245. The stops 243/245, which may be for example L-shaped angled portions or members configured to engage with row cleaner arm 221 to limit or define the range to which row cleaner assembly 200 may rotate about pivots 222/223 as moved by means of actuator 260 and during strip till planter operation. The limiter stops 243/245 optionally may include set screws or other suitable means to provide further means to adjust the range to which row cleaner assembly 200 may rotate about pivots 222/223.

Figure 10:
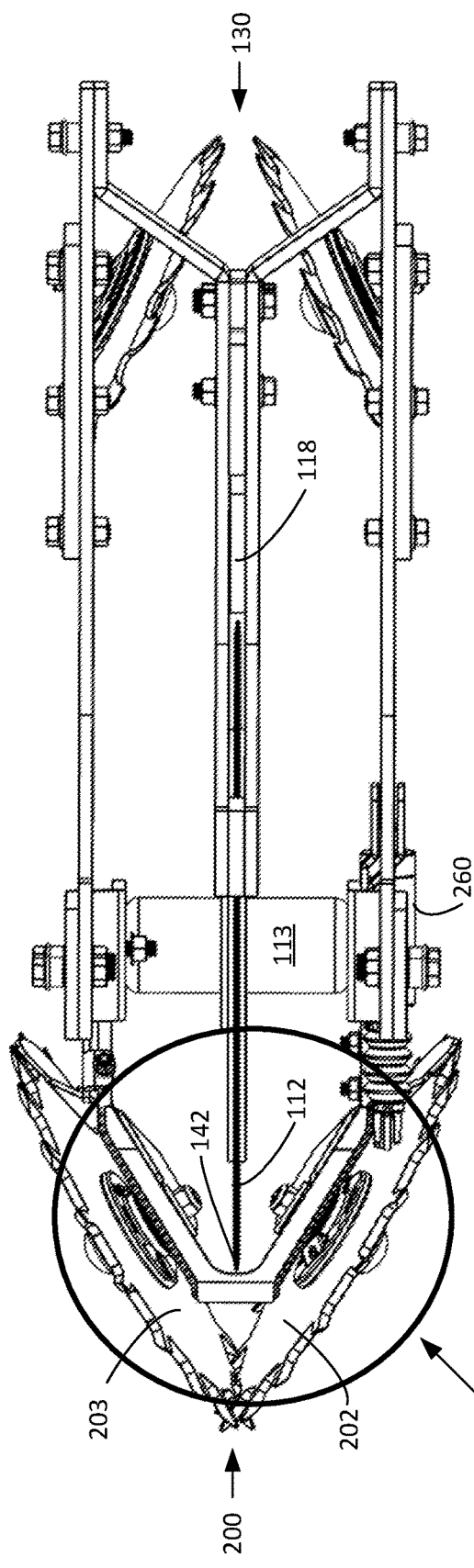
FIGS. 10 and 11 provide upward and downward facing illustrations featuring the close-proximity of row cleaner wheels and cutting disc of the first embodiment strip till row cleaner invention and further illustrate the first embodiment row closer invention in connection with a strip till machine.
Figure 11:
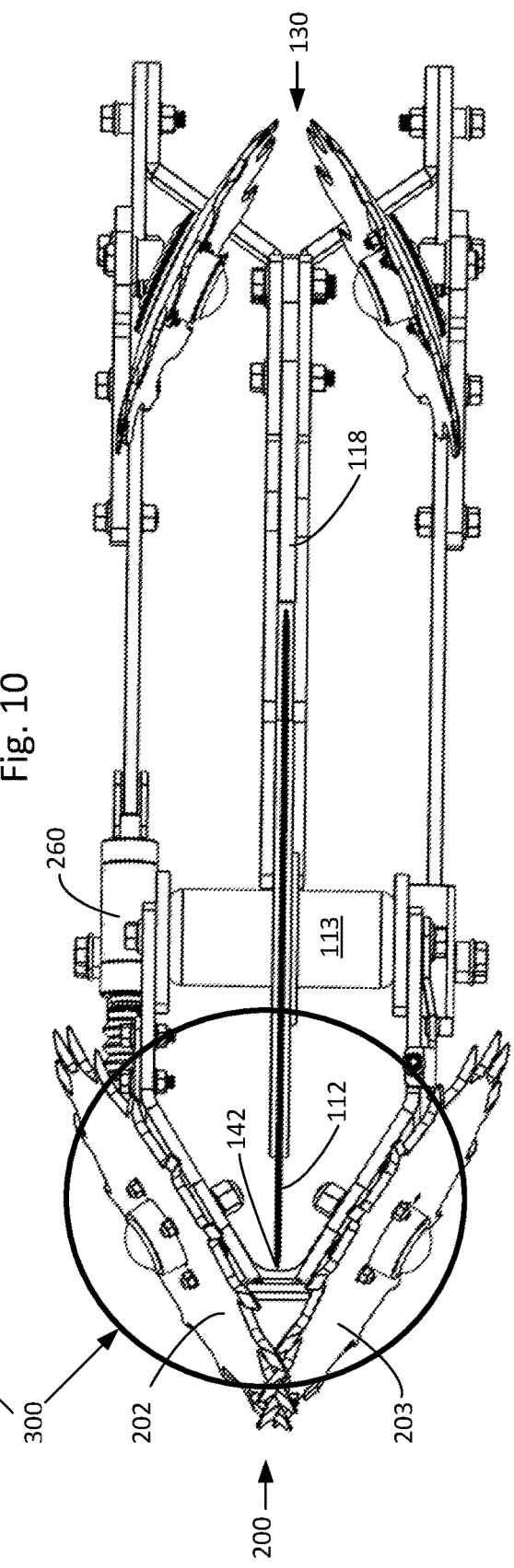

FIGS. 10 and 11 provide upward and downward facing illustrations featuring the close-proximity of row cleaner wheels and cutting disc of the first embodiment strip till row cleaner invention and further illustrate the first embodiment row closer invention in connection with a strip till machine.

FIGS. 10 and 11 illustrate the stretch and cut zone 300 provided by the combination of the row cleaner 200, with ground-driven row clearing wheels 202/203, and cutting disc 112. FIG. 10 is a top-down view of the row cleaner assembly 200 and FIG. 11 is a bottom-up view of the row cleaner assembly 200 (the figures also show closing section 130 and strip till shank 118 along with disc axle and support 113 and actuator 260). As shown in FIGS. 10 and 11, the row cleaning or clearing wheels 202/203 are positioned, configured or fixed close in proximity or distance to or closely coupled with cutting disc 112 and its leading edge 142. In typical no-till or low-till machine operations, the row cleaner is not in such close-proximity to the cutting disc, if one is provided at all. In strip till operation, the invention improves the operation of the strip till planter by adjustably bringing the row cleaner 200 in relatively close-proximity with the cutting disc 112 to provide a stretch and cut operation.

For example, harvesting of crops typically leaves a debris residue of vegetation and plant stubble referred to generally as residual mulch and after harvesting farmers may add mulch or straw to help preserve and protect the field from erosion and other unwanted effects. This residual and/or added debris or mulch causes significant depth control issues as a planter unit is operated to plant seeds in a field strewn with debris. In particular, debris that lies perpendicular to the travel path of the planting unit causes furrow opening and depth control problems. With the solution of the present invention, as the closely-coupled row cleaner 200 encounters debris in the field, the toe-in orientation of the clearing wheels 202/203 allow protruding teeth 206 to engage with debris to effectively stretch (or tension) and hold in place lengths of loose debris, such as surface straw, mulch and residual vegetation, so that cutting disc 112 cuttingly engages the stretched (tensioned) lengths of debris and cuts the debris thereby allowing the clearing wheels to more easily remove the debris to the side to permit the disc and the strip till shank 18 and/or other components to more easily and more cleanly and more accurately create a furrow for seed placement and effectively plant seeds. As the row clearing wheels 202/203 rotate, protruding teeth 206 grab trash, place it in tension. As this happens the wheels stretch the debris and the cutting disc 112 cuts the debris thereby tearing lengths of debris apart. As the clearing wheels continue to rotate, they pull the cut pieces to the side clearing the furrow path. If the row cleaner wheels are too far away from the cutting disc, then the debris engaged by the teeth of the wheels is released and no longer in tension or in a preferred cutting position by the time the cutting disc encounters the debris.

The proximity of the row cleaner wheels 202/203 to the cutting disc 112 may be adjusted based on the expected debris to be encountered. As shown in FIG. 6, row cleaner arm 221 is provided with two attachment points/pivots 227 and 229 either of which may be used as pivot 223. Row cleaner arm 220 is also provided with two or more attachment points/pivots in like manner. In this was the row cleaner 200 may be configured to achieve a desired distance between the row cleaner wheels and the cutting disc. Two or more such attachment points/pivots may be provided to allow for greater adjustability. By allowing the user to adjust this distance or proximity of the row cleaner to the cutting disc, the present invention provides an enhanced strip till planter.

In addition, actuator 260, the operation of which is described in more detail above and below, provides for controlled adjustment and operation of the row cleaner in a pivoting manner relative to the goal posts 104/105 and fixed cutting disc 112. As the cutting disc is circular and fixed in position by axle 113, the row cleaner angular displacement assembly 250, described above and below, moves the row cleaner 200 arcuately about the forward-most outer perimeter of the cutting disc as it rotates during strip till planter operation. The actuator biases the row cleaner 200 in a desired manner to maintain effective contact and clearance with the ground and encountered debris by means of the control system 280 described above.

Figure 12:
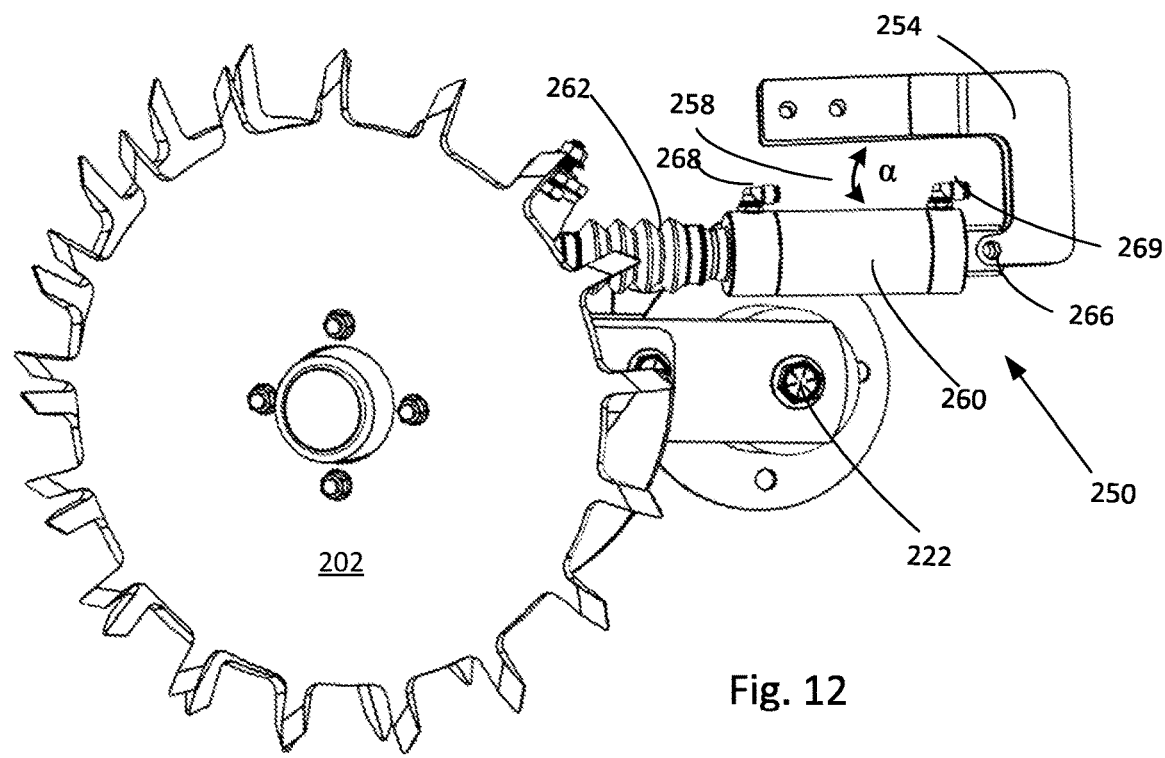
FIGS. 12 and 13 provide side illustrations featuring the actuator component in retracted and extended positions with the first embodiment strip till row cleaner in respective positions.
Figure 13:
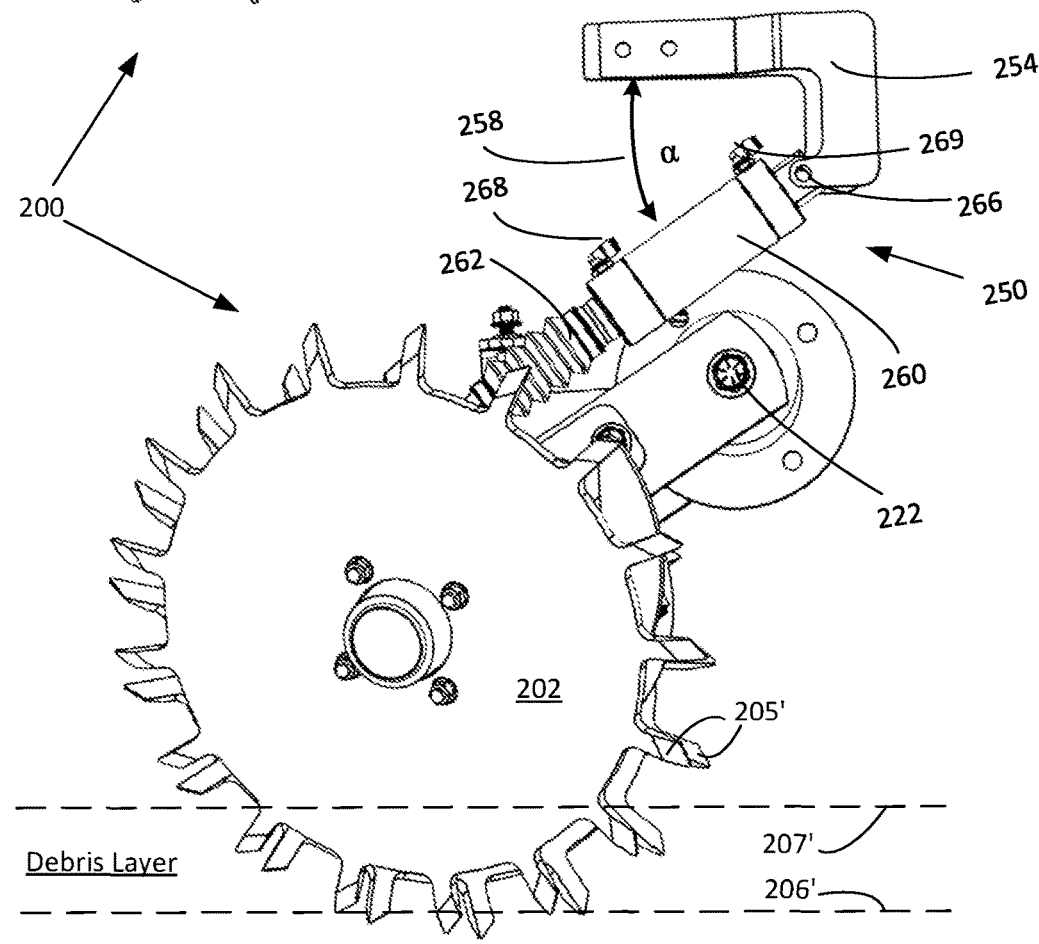

FIGS. 12 and 13 provide side illustrations featuring the actuator 260 with extendable arm 262 in retracted and extended positions with the first embodiment strip till row cleaner in respective positions. FIGS. 12 and 13 illustrate in detail row cleaner angular displacement assembly 250 comprising actuator 260 in two positions—an exemplary retracted position (FIG. 12) and an exemplary extended position (FIG. 13). FIG. 12 illustrates actuator 260 fixed by support member 254 at one end (pivot or connection 266) and having extendable arm 262 at an opposite end or portion in a retracted position forming a relatively shallow angle α in relation to the support member 254 and affixed support goal post 104. FIG. 13 illustrates actuator 260 fixed by support member 254 at end 264 and having extendable arm 262 in an extended position forming a relatively greater angle α in relation to the support member 254 and affixed support goal post 104. In one exemplary embodiment, the extendable arm 262 of actuator 260 has, for example, a travel of two inches. The two-inch travel of actuator arm 262 translates into a range of 0-8 inches of pivotal travel at the distal end of row cleaner 200 as row cleaner arms 220 and 221 pivot relative to goal posts 104 and 105 at pivots 222 and 223. The travel of actuator arm 262 is controlled by control inputs, e.g., pneumatic air pressure provided by control unit 280 as shown in FIG. 7.

FIG. 13 shows an exemplary positioning of row cleaner assembly 200 relative to soil line 206' and debris line 207'—debris generally lies between the soil line 206' and the debris line 207'. Cutting disc 112 (not shown) is generally perpendicular to both soil line 206' and debris line 207' with the cutting disc typically breaking or cutting into the soil at the soil line 206' and cutting debris encountered by it between the soil line 206' and the debris line 207'. Preferably, row cleaner wheels 202/203 are in close-proximity to the cutting disc to provide stretching of debris, especially lateral debris encountered when traveling along the field, as a prelude to or in conjunction with the cutting action of the cutting disc. Depending on the degree of camber, row cleaner wheels 202/203 will be more or less generally perpendicular to both soil line 206' and debris line 207'. Depending on the degree of toe, row cleaner wheels 202/203 will be more or less generally parallel to cutting disc 112 (not shown). Stretch and cut is a particularly desirable clearing action when encountering damp stalk or green vegetation that has not started to decompose or has not sufficiently decomposed, which makes such debris harder to move or displace. Without close-proximity of row clearing wheels 202/203 to the cutting disc, the debris tends to wrap up or wrap around the clearing wheels instead of being pushed aside. Although a scraper may be added to help remove wrapped debris from the clearing wheels, it is better to stretch and cut the debris and move it to the side.

Although travel of row cleaner 200 may be limited by the mechanical limitation of the range of actuator arm 262, it is preferred to use a separate mechanical limiter, e.g., limiter 240 as shown in FIG. 5, to protect actuator 260 from failure and being damaged by the row cleaner floating movement during operation of the strip till planting unit. Limiter 240 is preferably designed to limit movement of row cleaner 200 to prevent actuator 260 from traveling to its full range of extendable arm 262. Displacement angle 258 alpha (α) increases and decreases, respectively, as the axially extending arm 262 extends and retracts in response to electrical, hydraulic, and/or pneumatic control signals, e.g., changes in fluid pressures received at couplers or fittings 268 and 269.

As described above, limiter assembly 240 protects actuator 260 by limiting the range of motion of row cleaner 200.

FIGS. 14-19 provide a series of top-down views that illustrate various positioning of row cleaner wheels relative to cutting disc and with various toe alignment and spacing configurations. Importantly, the figures illustrate row clearing wheels in close-proximity to the cutting disc and not in close-proximity to the cutting disc. Close-proximity is a term used herein to differentiate between row closing arrangements as being more desirable (close-proximity) or less desirable (not in close-proximity) to achieve effective stretch and cut operation in clearing debris in strip till applications.

Hashed line 201' in FIGS. 14-19 represents an orthogonal center axis or wheel center line or wheel center plane defined by a line or plane extending through the center hub openings formed in wheels 202 and 203 with the line or plane being orthogonal or perpendicular to the line, axis or plane formed along the length of the cutting disc 112. In the case of the wheel center plane, the wheel center plane is orthogonal or perpendicular to the ground (e.g., perpendicular to soil line 206' and debris line 207' of FIG. 13) during operation of a strip till machine, as is indicated in the top-down views of FIGS. 14-19. This line or plane 201' extends through the center of the wheels 202/203 and represents a relative positioning of the wheels, based on wheel center, to the cutting disc. For example, the position of hashed line or plane 201' to leading edge 142 in FIG. 14 clearly passes through the body of cutting disc 112. In contrast, the position of hashed line 201' to leading edge 142 in FIG. 15 clearly does not pass through the body of cutting disc 112. It is clear when comparing the relative positions of hashed line 201', and therefor also the relative positions of cleaner wheels 202/203, in FIGS. 14 and 15 that cleaner wheels 202/203 are closer to and in close-proximity with cutting disc 112 in the configuration of FIG. 14 and cleaner wheels 202/203 are farther from and not in close-proximity to cutting disc 112 in the configuration of FIG. 15.

Alternatively, hashed line 204' in FIGS. 14-19 represents a trailing line or trailing plane defined by a line or plane extending through a pair of teeth 205' (FIGS. 13 and 16) exiting the debris field or line 207' (FIG. 13) as wheels 202 and 203 rotate with the trailing line or plane 204' being orthogonal or perpendicular to the line, axis or plane formed along the length of the cutting disc 112. In the case of the wheel center plane, the wheel center plane is orthogonal or perpendicular to the ground (e.g., perpendicular to soil line 206' and debris line 207' of FIG. 13) during operation of a strip till machine, as is indicated in the top-down views of FIGS. 14-19. This line or plane 204' extends through the pair of teeth 205' of the wheels 202/203 and represents an alternative relative positioning of the wheels, based on where the teeth exit the soil and debris lines, to the cutting disc. For example, the position of hashed line or plane 204' to leading edge 142 in FIG. 14 clearly passes through the body of cutting disc 112. In contrast to the hashed line 201', the position of hashed line 204' to leading edge 142 in FIG. 15 clearly does pass through the body of cutting disc 112 and is in close-proximity to cutting disc 112 using this as the point of measure. It is clear when comparing the relative positions of hashed line 201' and alternative marker hashed line 204', these points of observation of the relative positions of cleaner wheels 202/203 provide alternative manners of determining close-proximity of the row cleaner wheels 202/203 with the cutting disc.

Figure 14:
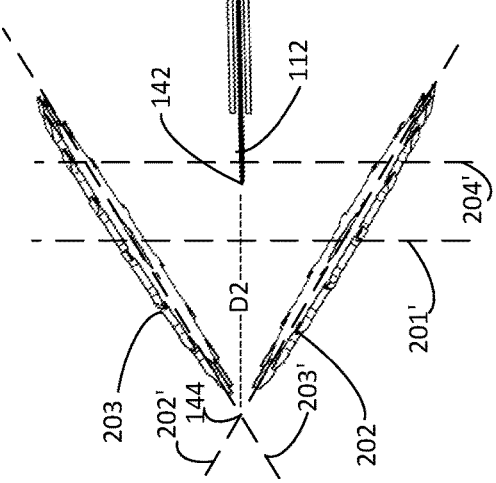
FIGS. 14-17 provide a series of top-down views that illustrate various positioning of row cleaner wheels relative to cutting disc and with various toe alignment and spacing configurations.

As shown in FIG. 14, the row cleaner assembly provides a close-proximity configuration of row cleaner wheels 202/

203 to leading edge 142 of cutting disc 112. The cleaner wheels 202/203 have a toe-in alignment and converge or meet at a point 143 that is a distance D1 from the leading edge 142 of disc 112. Also, and perhaps more important, regardless of toe alignment wheels 202/203 are shown as being in close-proximity with the cutting disc by the fact hat both line/plane 201' and line/plane 204' pass through the body of the cutting disc 112. Configuration of the row assembly components to achieve a preferred toe alignment and a preferred distance, e.g., D1, may be a function of the anticipated debris to be encountered and specifically the type and expected lengths of the key debris components.

Figure 15:
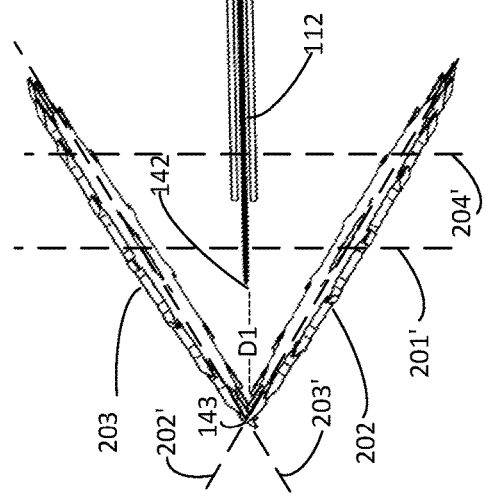

FIG. 15 illustrates a second configuration in which row cleaner wheels 202/203 have a similar toe-in alignment as that shown in FIG. 14. However, the wheels 202/203 in FIG. 15 are moved forward of the leading edge 142 of cutting disc 112 such that line 201' does not intersect the cutting disc. If only considering the center wheel line/hashed line 201' in determining whether row cleaner wheels 202/203 are in close-proximity with cutting disc 112, then the configuration of FIG. 15 is not in close-proximity. However, if considering the trailing line/hashed line 204' in determining whether row cleaner wheels 202/203 are in close-proximity with cutting disc 112, then the configuration of FIG. 15 is in close-proximity. Also, as shown the cleaner wheels of FIG. 15 do not intersect or mesh and this causes the point of intersection 144 of lines 202' and 203' to be further forward of the cutting disc. The intersection of lines 202' and 203' associated with cleaner wheels 202/203 is a distance D2 from the leading edge 142 of disc 112. D2 is greater than D1 as shown. Accordingly, the row cleaner assembly may be configured to insure a close-proximity of the cleaner wheels 202/203 to the cutting disc by only allowing fixed attachment (or limited range of options) and requiring a specified diameter of wheel and disc sizes to insure the hashed line/plane 201' and/or the hashed line/plane 204' passes through the body of the cutting disc or falls at or very near the leading edge 142.

Optionally, the distance measured between the intersection of lines 202' and 203' and the leading edge 142 may be set or adjusted by positioning/repositioning and securing row cleaner frame and arms 220/221 to the goal posts 104/105 as cutting disc 112 remains in place. By positioning/repositioning arms 220/221 and wheels 202/203 a user may effectively move the position of line 201' and line 204' relative to the cutting disc 112 to achieve close-proximity or to avoid close-proximity depending on the determinate used.

Optionally, arms 220/221 may be provided along their lengths with a plurality of wheel/hub securement bores to which row cleaner hubs 230/231 and wheels 202/203 are attached. In this manner, the row cleaning assembly 200 provides an adjustable distance D1/D2 between cutting disc 112 and the intersection of lines 202'/203'. In similar manner, arms 220/221 may be moved to bring hashed line 201' and/or line 204' passing through the body of cutting disc 112 to achieve close-proximity. With the hubs disposed as shown in FIGS. 8-9 and 14-17, the row cleaner assembly provides a toe-in alignment of varying degrees. Another feature to row cleaner wheel configuration that affect row cleaning performance is the extent to which row cleaner wheels may intersect and teeth "mesh" during operation. While the toe-in alignment of row cleaner wheels 202/203 in FIGS. 14 and 15 are essentially the same, the wheels/teeth intersect with teeth meshing in FIG. 14 and the wheels/teeth do not intersect and mesh in FIG. 15. In addition, the row cleaner assembly may be configured to allow for an offset positioning of the wheels 202/203 with one being more forward of the other. This can also be achieved by providing a plurality of mounting pivot points on the arms 220/221. For example, instead of one or more fixed bores or through holes on arms 220/221, an elongated slot may be provided to allow a range of positioning along a continuum of the slot.

Figure 16:
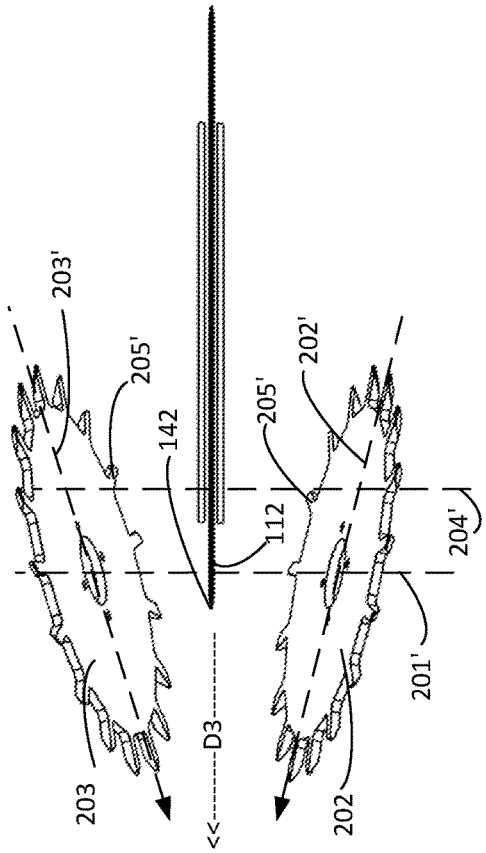
Figure 17:
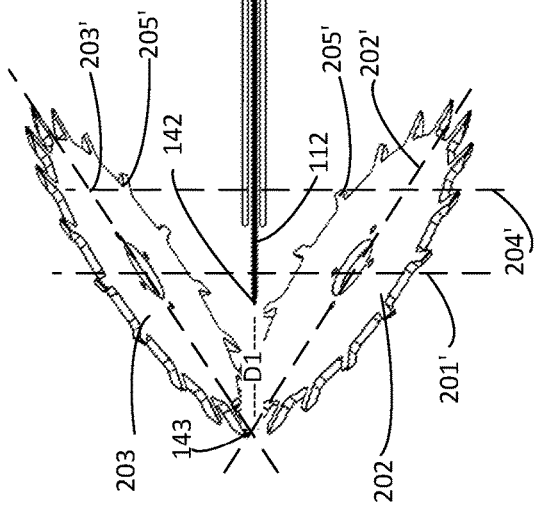

FIG. 16 shows cleaner wheels 202/203 as having similar toe-in to the wheel arrangement of FIGS. 14 and 15 and unmeshed or intersecting as in the arrangement of FIG. 15. Another feature that may be configured to achieve performance benefits is "camber." FIGS. 16 and 17 show wheels 202/203 as having more negative camber as compared to the wheel arrangement of FIGS. 14 and 15. Depending on soil conditions and the anticipated debris, a user may adjust the wheels 202/203 to change the camber relative to ground. As described below in the context of the closing wheel assembly 130 (FIGS. 20-22), the row cleaner wheel assembly 200 may also include the feature of an adjustable hub/axle (138/139/140/141) and selecting lever (136/137).

FIGS. 16 and 17 illustrate how a significant change in toe-in angle can result in a corresponding large difference in distances D1 and D3, i.e., the distance from the point of intersection of axes 202'/203' to the leading edge 142. It is important to note that notwithstanding the significant distance D3 extending well in front of the figure, the row cleaner wheels 202/203 are still in close-proximity with cutting disc 112 as line 201' passes through the body of the cutting disc in both configurations. While toe and camber factor in row clearing performance of row cleaner assembly 200, the relative position of the center of wheels 202/203 to the cutting disc is the measurement used to determine "close-proximity" in connection with the present invention.

It is important to note that notwithstanding the significant distance D3 extending well in front of the figure, the row cleaner wheels 202/203 are still in close-proximity with cutting disc 112 as line 201' passes through the body of the cutting disc in both configurations. While toe and camber factor in row clearing performance of row cleaner assembly 200, the relative position of the center of wheels 202/203 and/or the exiting teeth position to the cutting disc is the measurement used to determine "close-proximity" in connection with the present invention.

Hashed lines 202' and 203' in FIGS. 14-19 represent, respectively, center axes formed through, and within a plane formed by, wheels 202 and 203. These lines go through the center of the wheels and are used to illustrate intersection points 143/144 of the wheel axes 202'/203' by which distances from the row cleaner wheels 202/203 and cutting disc leading edge 142, e.g., distances D1 and D2, may be determined.

As shown in FIG. 16, the wheels 202/203 have a more negative camber as compared to the wheels 202/203 shown in FIGS. 14 and 15 while the toe-in is similar to that of FIGS. 14 and 15. As shown, the distance D1 is the same in FIG. 16 as that shown in FIG. 14 and less than D2 of FIG. 15 and D3 of FIG. 17. With reference to FIG. 17, row cleaner wheels 202/203 are shown having a much reduced toe-in angle as compared to that of FIGS. 14-16, and a camber similar to that shown in FIG. 16. FIG. 17 shows wheels 202/203 having a corresponding point of intersection of axes 202'/203' and distance D3 far in front of the leading edge 142 of the cutting disc.

Figure 18:
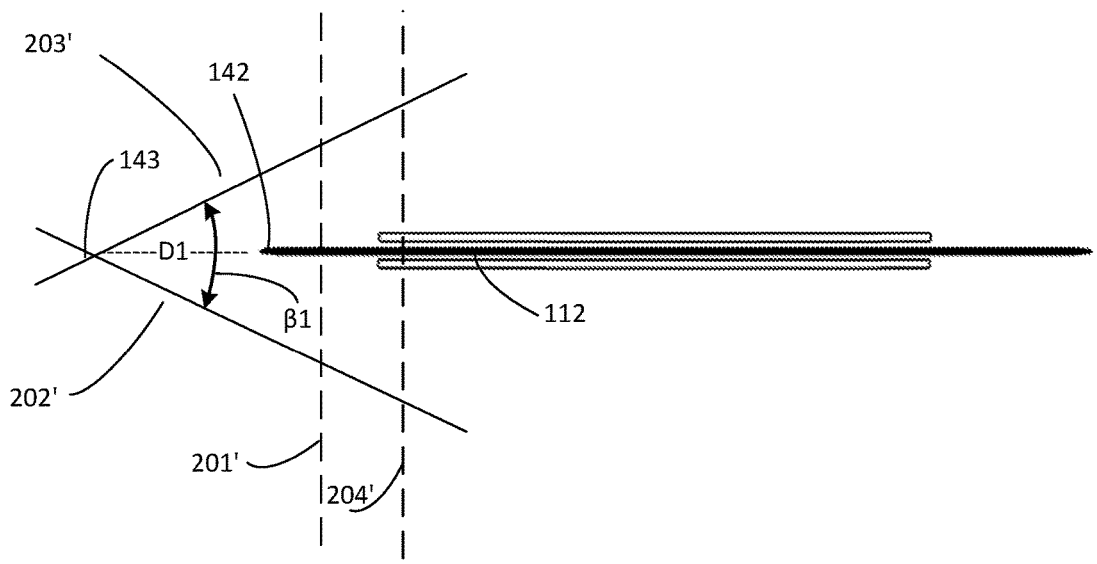
FIG. 18 illustrates the intersection of the central axes/plane and trailing line/plane associated with the row cleaner wheels 202/203 as shown in the toe alignment and spacing configuration of FIG. 14.
Figure 19:
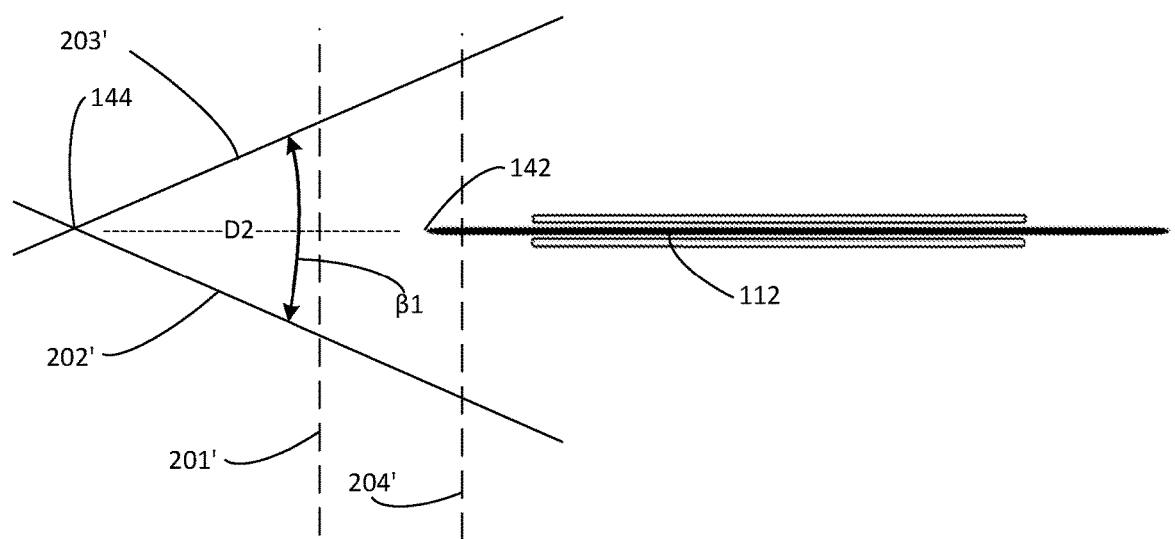
FIG. 19 illustrates the intersection of the central axes/plane and trailing line/plane associated with the row cleaner wheels 202/203 as shown in the toe alignment and spacing configuration of FIG. 15.

FIGS. 18 and 19 illustrate how a cleaner wheel configuration in which wheels 202/203 have a common toe-in angle (31 but have different distances D1 and D2, i.e., the distance from the point of intersection of axes 202'/203' to the leading edge 142. Using hashed line/plane 201' as the determinate for determining close-proximity and of the clearing wheels 202/203 to the cutting disc 112, the configuration of FIG. 18 provides row cleaner wheels 202/203 in close-proximity to cutting disc 112—with orthogonal center wheel line 201' passing through the body of cutting disc 112. The configuration of FIG. 19 provides row cleaner wheels 202/203 not in close-proximity to cutting disc 112—with orthogonal center wheel line 201' not passing through the body of cutting disc 112.

Alternatively, using hashed line/plane 204' as the determinate for determining close-proximity and of the clearing wheels 202/203 to the cutting disc 112, both the configurations of FIG. 18 and FIG. 19 provides row cleaner wheels 202/203 in close-proximity to cutting disc 112—with trailing line/plane 204' of the exiting teeth 205' passing through the body of cutting disc 112.

FIG. 18 illustrates the intersection 143 of the center axes 202'/203' associated with the row cleaner wheels 202/203 having the toe alignment and spacing configuration of FIG. 14. Wheels 202/203 are removed for ease of illustration. The axes 203' and 202' intersect at a point 143 and form an angle β1 relative to each other. This illustration shows the distance from the intersection point 143 of cleaner wheels 202/203 to the cutting disc as distance D1. Note that by changing the toe-in alignment of the wheels an operator may move the point of intersection 143 closer or farther distance to/from the cutting disk. Also note that changing toe angle does not change relative position of hashed line 201' and proximity of the cleaner wheels to the cutting disc based on hashed line 201'. As shown in FIG. 18, as in FIG. 14, the hashed line 201' passes through the body of cutting disc 112 and the cleaner wheels are in close-proximity to the cutting disc using this determinative.

FIG. 19 illustrates the intersection 144 of the center axes 202'/203' associated with the row cleaner wheels 202/203 having the toe alignment and spacing configuration of FIG. 15. The axes 203' and 202' intersect at a point 144 and form an angle β1 relative to each other. The toe alignment and the angle β1 formed by the intersecting axes 202'/203' are the same in FIGS. 18 and 19. However, the wheels 202/203 in FIG. 19 are moved forward of the cutting disc and there is greater distance between the intersection point 144 and the leading edge 142 of the cutting disc. Wheels 202/203 are removed for ease of illustration. This illustration shows the distance from the intersection point 144 of cleaner wheels 202/203 to the cutting disc as distance D2.

FIGS. 20-22 provide perspective illustrations of the first embodiment row closer invention featuring a lever toe and camber adjustment mechanism and related closing wheel assembly with components removed for ease of illustration. The row closer assembly 130 is attached to a strip till machine 100 and includes oppositely facing closing wheels 134 and 135, an axle/hub component 138/140 used on right hand wheel 134 and an axle/hub component 139/141 used on left hand wheel 135. The row closing assembly 130 includes a lever or stem 136 connected to axle/hub component 138/140 used on right hand wheel 134 and a lever 137 connected to an axle/hub component 139/141 used on left hand wheel 135. In this exemplary embodiment, axles 138/139 have an angled face to which hubs 140/141 are attached.

The levers 136/137 are attached at one end to the axles 138/139 and as levers 136/137 are rotated about the connection point, the angled faces of axles 138/139 cause hubs 140/141, and therefore wheels 134/135, to rotate relative to the supporting arms 132/133. As levers 136/137 are moved and axle/hub assemblies 138/139/140/141 rotate, the toe and camber alignments of wheels 134/135 change relative to ground. The levers individually or in tandem provide toe and camber adjustment for the respective closing wheels 134/135. A set of lever fixation points may be provided on the respective supporting arms 132/133, or other intermediate component, and include position locking members, such as pins, bolts, nuts, springs, holes, bores, shoulders, adapted or configured to hold the closing wheel lever or stem in place. The pair of hubs 140/141 are angled relative to ground by the angled face of axles 138/139 and provide a toe-in configuration of the oppositely facing closing wheels to allow closing wheels to be adjustably angled by operation of the lever assembly in either or both of vertical and/or horizontal planes to provide a desired orientation of the closing wheels with respect to the furrow. The levers 136/137 may be selectively rotated among a plurality of positions associated with the set of lever fixation points to set a desired toe and/or camber position of the closing wheels. Alternatively, a unified or common axle 138/139 may be provided that connects both hubs 140/141 and to which a single lever may be attached to adjust toe and/or camber of both wheels 134/135.

While the invention has been described by reference to certain preferred embodiments, it should be understood that numerous changes could be made within the spirit and scope of the inventive concept described. In implementation, the inventive concepts may be automatically or semi-automatically, i.e., with some degree of human intervention, performed. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

It should be noted that the present systems and/or methods are not limited to the specific embodiments described herein, but is intended to apply to all similar systems and/or methods for removing debris and/or providing a certain amount of tilling. Modifications and alterations from the described embodiments will occur to those skilled in the art without departure from the spirit and scope of the present systems and/or methods. It should be noted that the present invention is not limited to the specific embodiments pictured and described herein but is intended to apply to all similar methods for ground surface penetration during operation of strip till machinery. Accordingly, modifications and alterations from the described embodiments will occur to those skilled in the art without departure from the spirit and scope of the present invention, the scope of which is only limited by the appended claims that follow.

What is claimed is:

1. A row cleaner adapted to be attached to a strip till machine having a frame mounting plate, a cutting disc, an axle adapted to permit rotation of the cutting disc, and a set of oppositely facing posts connected to the frame mounting plate and adapted to support the axle and the cutting disc at a pair of connecting points, the row cleaner adapted to clear mulch and other debris encountered in strip or low till planting and comprising:
  a row cleaner frame assembly connected to and supported by the set of oppositely facing posts, the row cleaner frame assembly comprising:
    a pair of row cleaner arms each having a proximal end located proximal to the set of oppositely facing posts, and a distal end located distal to the set of oppositely facing posts, the row cleaner arm proximal ends being spaced apart and disposed on opposite sides of the cutting disc; and
    a pair of clearing wheels each having a wheel body and a set of spaced apart teeth protruding radially about the circumference of the wheel body, the pair of row cleaner wheels rotationally connected, respectively, to the row cleaner arm distal ends and being configured to have a toe-in alignment to assist in debris removal;
    wherein the pair of row cleaner arms share a common plane and are pivotally connected at the proximal ends to the oppositely facing posts at a pair of pivot points with the cutting disc disposed intermediate the proximal ends and the pivot points sharing a rotational axis of the cutting disc; and
    wherein the row clearing wheels are in a close-proximity to the cutting disc.

2. The row cleaner of claim 1 wherein close-proximity is determined by a wheel center line extending between the centers of the clearing wheels and generally orthogonal to the cutting disc, the wheel center line being at or coming within 0.5 inch of a leading edge of the cutting disc or intersecting the cutting disc.

3. The row cleaner of claim 1 wherein close-proximity is determined by a wheel center plane extending between the centers of the closing wheels and in a direction parallel to the ground during operation of the strip till machine, the wheel center plane falling within the cutting disc or coming within 0.5 inch of a leading edge of the cutting disc.

4. The row cleaner of claim 1 wherein the set of spaced apart teeth are uniformly spaced apart along the circumference of the wheel body, and wherein with rotation of the pair of clearing wheels through the debris field during operation of a strip till machine, a trailing line is defined to be between teeth exiting the debris field and generally orthogonal to the cutting disc, wherein close-proximity is determined by the trailing line at a leading edge of the cutting disc or intersecting the cutting disc.

5. The row cleaner of claim 1 wherein the set of spaced apart teeth are uniformly spaced apart along the circumference of the wheel body, and wherein with rotation of the pair of clearing wheels through the debris field during operation of a strip till machine, a trailing plane is defined as extending between teeth exiting the debris field and generally orthogonal to ground during strip till operation, wherein close-proximity is determined by the trailing plane at the leading edge of the cutting disc or intersecting the cutting disc.

6. The row cleaner of claim 1 wherein the pair of clearing wheels are configured to have a positive camber relative to ground.

7. The row cleaner of claim 1 wherein each of the pair of row cleaner arms has a proximal section including a plurality of pivot points, the plurality of pivot points providing alternative proximal end locations and adjustable proximity of the row cleaning wheels and a leading edge of the cutting disc.

8. The row cleaner of claim 1 wherein each of the pair of row cleaner arms has a parallel section at which the proximal end is disposed and an angled distal section at which a row cleaner wheel is attached, whereby the two parallel sections are essentially parallel to each other and the two angled distal sections angle in toward one another and provide a toe-in configuration.

9. The row cleaner of claim 8 wherein the two row cleaner arm angled distal sections come together at a junction at a point most distal from the set of oppositely facing posts.

10. The row cleaner of claim 8 wherein each of the row clearing wheels are mounted, respectively, at a selected one of a plurality of mounting points disposed along each row cleaner arm angled section.

11. The row cleaner of claim 1 wherein the cutting disc and axle are rotatably attached to each post at the row cleaner arm pivot points such that the rotational axis defined by the axle and the connecting points on the oppositely facing posts lies in a common axis with the two row cleaner arm pivot points.

12. The row cleaner of claim 1 wherein the row cleaner arm pivot points are not common with and are disposed above the cutting disc rotational axis.

13. The row cleaner of claim 1 further comprising:
  an actuator having a fixed body portion and an extendable arm portion operably connected to a row cleaner arm from the pair of row cleaner arms, the actuator having a control input and being adapted to receive a control input from a control system for controlling displacement of the extendable arm to extend from a retracted position to an extended position and to retract from the extended position to the retracted position or points therebetween, whereby the actuator causes the row cleaner frame to rotate about the pair of pivot points.

14. The row cleaner of claim 13 further comprising a row cleaner assembly travel limiter providing upper and lower limits to restrict pivoting travel of the row cleaner about the pair of pivot points thereby preventing excessive forces from acting on the actuator.

15. A strip till machine comprising:
  a frame mounting plate;
  a cutting disc and an axle adapted to permit rotation of the cutting disc;
  a set of oppositely facing posts connected to the frame mounting plate and adapted to support the axle and the cutting disc at a pair of connecting points, the cutting disc adapted to rotate about a rotational axis defined by the axle and the connecting points on the oppositely facing posts;
  a row cleaner adapted to clear mulch and other debris encountered in strip or low till planting and comprising:
  a row cleaner frame assembly connected to and supported by the set of oppositely facing posts, the row cleaner frame assembly comprising:
    a pair of row cleaner arms each having a proximal end located proximal to the set of oppositely facing posts, and a distal end located distal to the set of oppositely facing posts, the row cleaner arm proximal ends being spaced apart and disposed on opposite sides of the cutting disc; and
    a pair of clearing wheels each having a wheel body and a set of spaced apart teeth protruding radially about the circumference of the wheel body, the pair of row cleaner wheels rotationally connected, respectively, to the row cleaner arm distal ends and being configured to have a toe-in alignment to assist in debris removal;
    wherein the pair of row cleaner arms share a common plane and are pivotally connected at the proximal ends to the oppositely facing posts at a pair of pivot points with the cutting disc disposed intermediate the proximal ends and the pivot points sharing a rotational axis of the cutting disc; and wherein the row clearing wheels are in a close-proximity to the cutting disc.

16. The strip till machine of claim 15 further comprising a row closing wheel assembly comprising:

at least one closing wheel attached in rotatable fashion to at least one axle having a face angled to effect a closing wheel toe-out configuration;

at least one lever assembly having a lever coupled to the at least one axle and configured to provide adjustable positioning of the at least one closing wheel relative to the ground.

17. The strip till machine of claim 16, wherein the at least one lever assembly further comprises:

a ring portion connected to the at least one axle; and a lever position member comprising a plurality of locking points adapted to receive a pin, protrusion or other locking means provided on the lever to hold the lever in place and to maintain a desired orientation of the at least one closing wheel.

18. The strip till machine of claim 15 further comprising:

a set of upper plate connecting arms each having an upper front end and an upper rear end, each upper front end movably secured to the frame mounting plate at a set of upper frame pivot points with each upper rear end distal to the frame mounting plate; and a set of lower plate connecting arms each having a lower front end and a lower rear end, each lower front end movably secured to the frame mounting plate at a set of lower frame pivot points with each lower rear end distal to the frame mounting plate, wherein the sets of upper and lower connecting arms are parallel to one another and extend outward from the frame mounting plate;

wherein the sets of upper and lower connecting arms are respectively connected to the oppositely facing posts at pivot points disposed on the upper and lower rear ends distal to the frame mounting plate.

* * * * *